US009656587B2

(12) United States Patent
Mullin et al.

(10) Patent No.: US 9,656,587 B2
(45) Date of Patent: *May 23, 2017

(54) TILTLOADER FOR TRANSFERRING CARGO

(71) Applicant: Miller Industries Towing Equipment, Inc., Ooltewah, TN (US)

(72) Inventors: Dean T. Mullin, New Maryland (CA); John M. Cullum, Queensland (AU); David W. Bannon, Chatanooga, TN (US); Christopher L. Wilcox, Fredericton (CA)

(73) Assignee: Miller Industries Towing Equipment, Inc., Ooltewah, TN (US)

( * ) Notice: Subject to any disclaimer, the term of this patent is extended or adjusted under 35 U.S.C. 154(b) by 242 days.

This patent is subject to a terminal disclaimer.

(21) Appl. No.: 13/892,155

(22) Filed: May 10, 2013

(65) Prior Publication Data

US 2014/0205406 A1 Jul. 24, 2014

Related U.S. Application Data

(62) Division of application No. 12/749,092, filed on Mar. 29, 2010, now Pat. No. 8,459,925.

(51) Int. Cl.
*B60P 1/32* (2006.01)
*B60P 1/64* (2006.01)

(52) U.S. Cl.
CPC .............. *B60P 1/32* (2013.01); *B60P 1/6454* (2013.01)

(58) Field of Classification Search
CPC .................................. B60P 1/32; B60P 1/6454

USPC ....... 414/345, 346, 395, 400, 476–480, 491, 414/494, 500, 550
See application file for complete search history.

(56) References Cited

U.S. PATENT DOCUMENTS

| 2,588,001 | A | * | 3/1952 | Holland ........................ 414/477 |
| 2,786,590 | A | * | 3/1957 | Edwards et al. .............. 414/477 |
| 3,417,890 | A | * | 12/1968 | Yamazki ....................... 414/478 |
| 3,957,166 | A | * | 5/1976 | Durham ....................... 414/494 |
| 4,225,280 | A | * | 9/1980 | Brunet et al. ................. 414/479 |
| 4,400,130 | A | * | 8/1983 | Anttila et al. ................ 414/478 |
| 5,040,815 | A | * | 8/1991 | Evans ....................... 280/425.2 |
| 5,281,072 | A | * | 1/1994 | Patouillard et al. .......... 414/349 |
| 5,529,454 | A | * | 6/1996 | Alm et al. .................... 414/478 |

(Continued)

FOREIGN PATENT DOCUMENTS

EP 0564403 A1 * 10/1993 ............ B60P 1/6454

*Primary Examiner* — James Keenan
(74) *Attorney, Agent, or Firm* — Michael P. Mazza, LLC

(57) ABSTRACT

A device and method for moving tilt frame and transfer bed portions of a cargo transfer system are disclosed. In one embodiment, the invention may include a table and a pin secured to the transfer bed. The table may pivot on a horizontal axis allowing the transfer bed to be placed in a horizontal orientation during inclination of the tilt frame. The table may also pivot on a vertical axis so that the transfer bed may swing side-to-side, and may also pivot on a z-axis enabling the transfer bed to roll side-to-side relative to the table. An adjustable carriage with independently movable stabilizer legs may be used to level the transfer bed on uneven ground. The tilt frame may also include an extendable boom and a retractable roller system to facilitate loading and unloading of material such as flat rack platforms and pallets.

5 Claims, 44 Drawing Sheets

(56) References Cited

U.S. PATENT DOCUMENTS

| | | | |
|---|---|---|---|
| 6,139,248 A * | 10/2000 | Bentgen et al. | 414/495 |
| 6,461,096 B1 * | 10/2002 | Mentele et al. | 414/480 |
| 6,631,917 B1 * | 10/2003 | Chapman | 280/491.5 |
| 6,857,840 B2 * | 2/2005 | Simpson et al. | 414/491 |
| 7,011,485 B2 * | 3/2006 | Henry | 414/480 |
| 7,134,829 B2 * | 11/2006 | Quenzi et al. | 414/482 |
| 2004/0156701 A1 * | 8/2004 | Scranton et al. | 414/491 |
| 2004/0179927 A1 * | 9/2004 | Georges | 414/491 |

\* cited by examiner

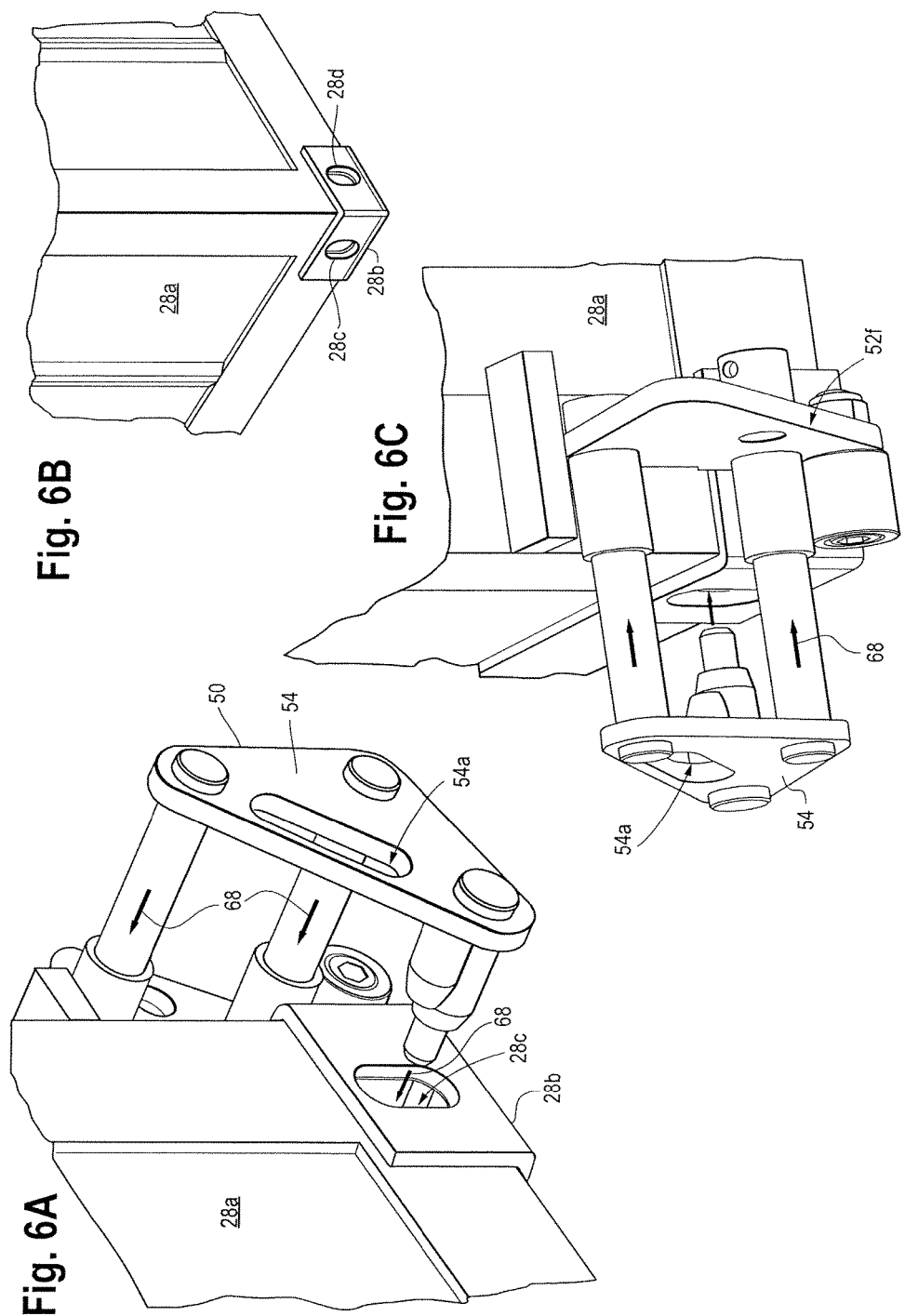

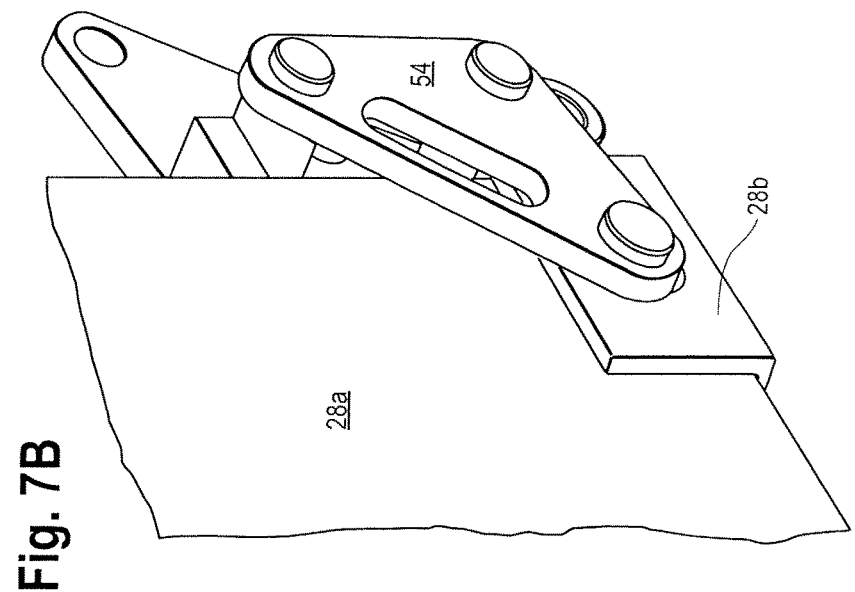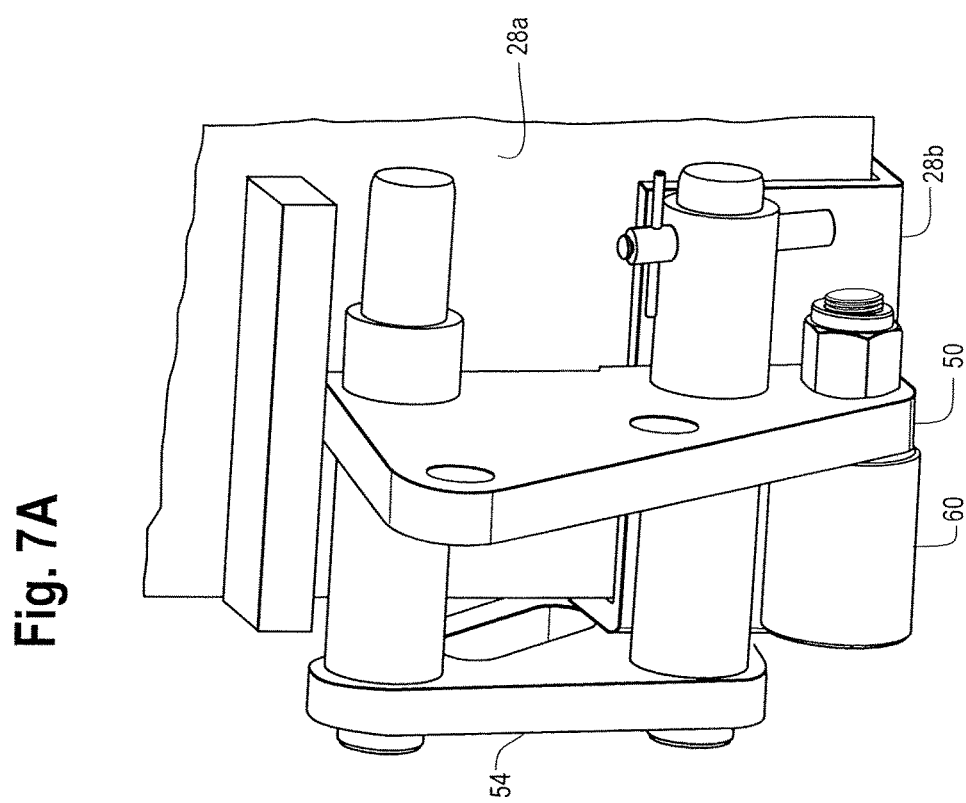

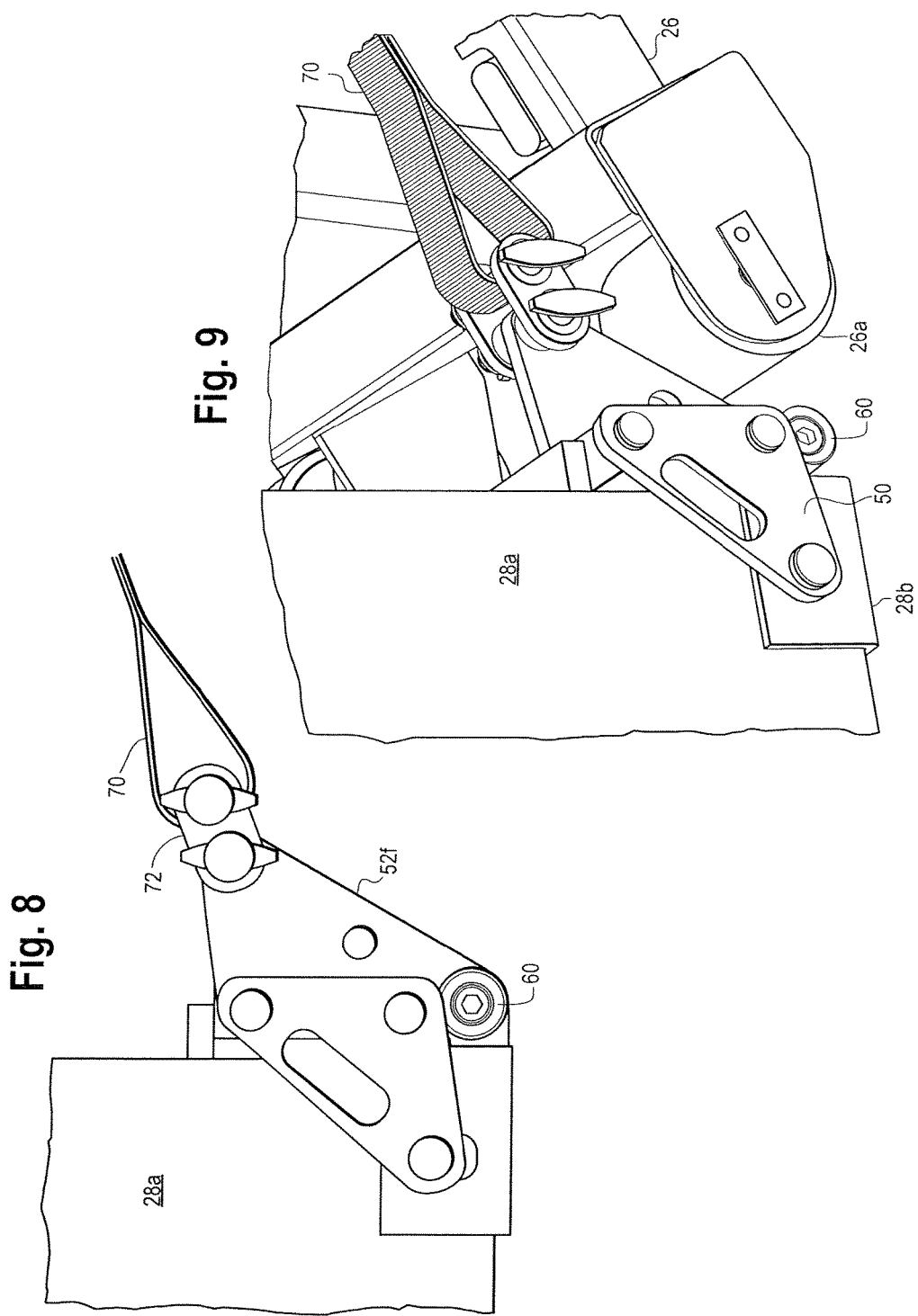

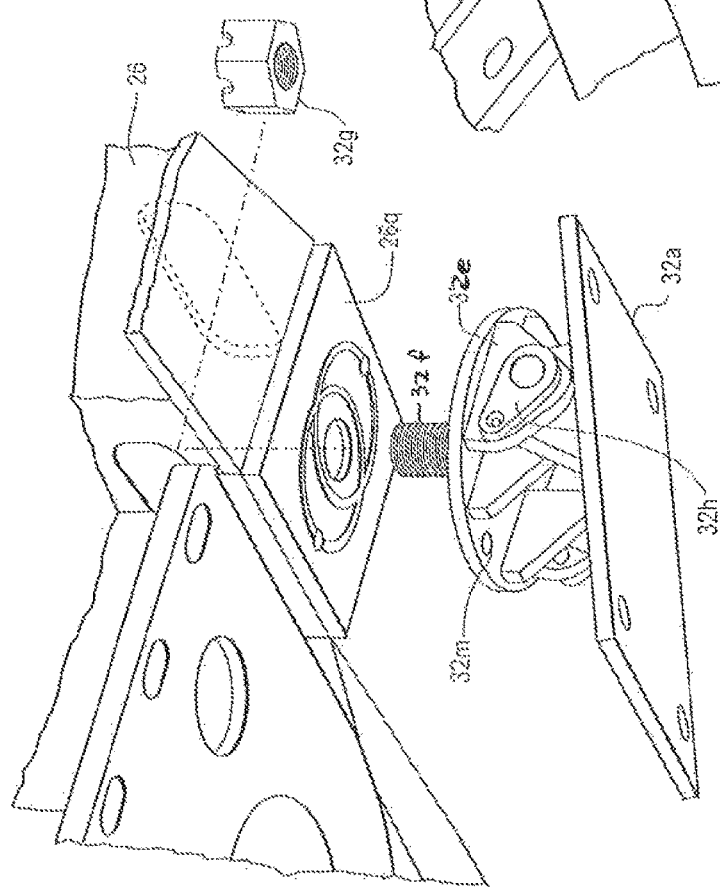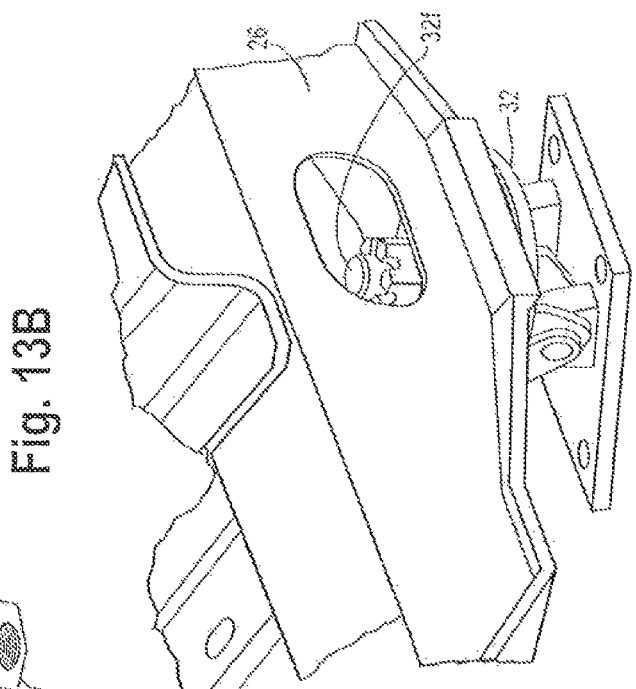

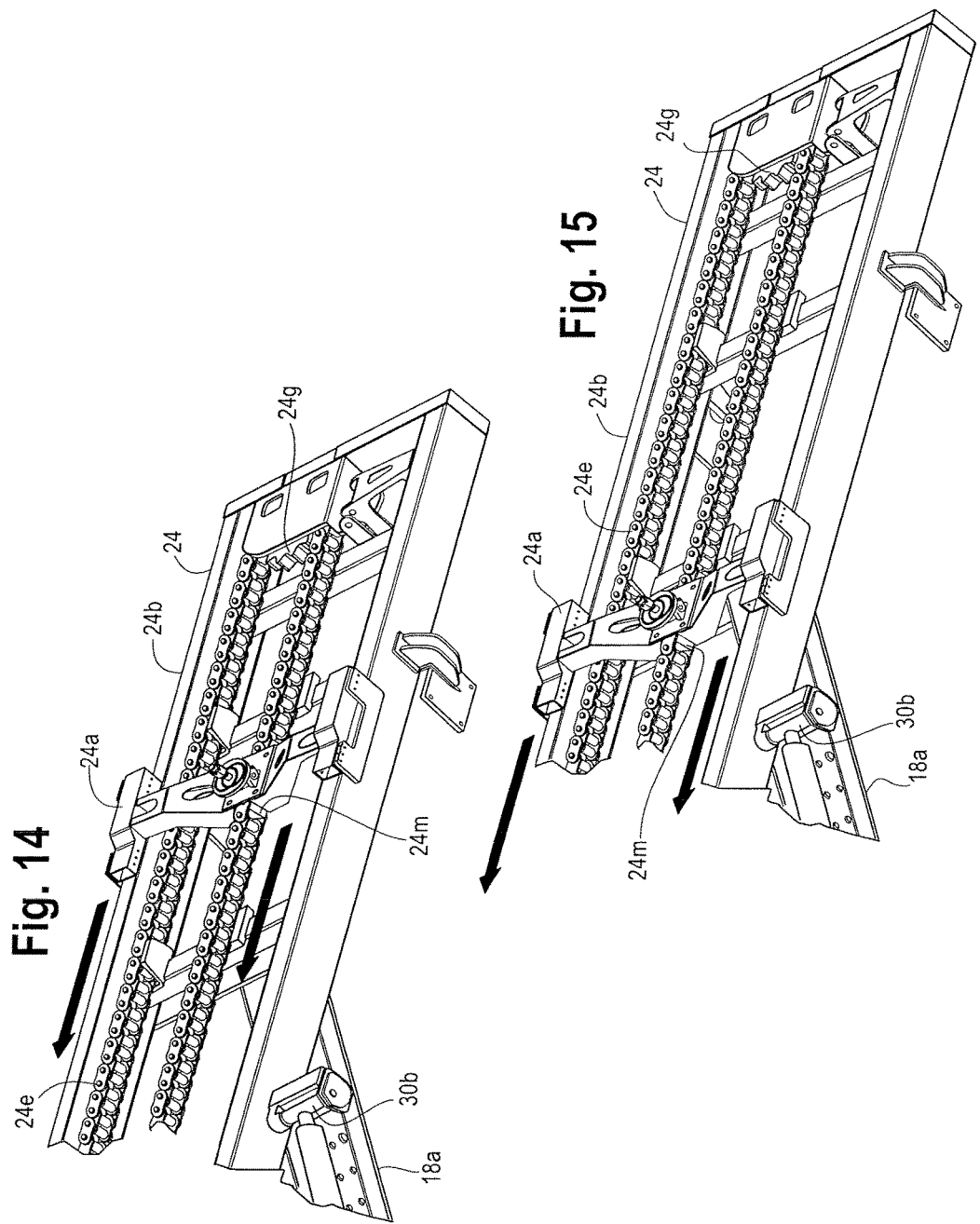

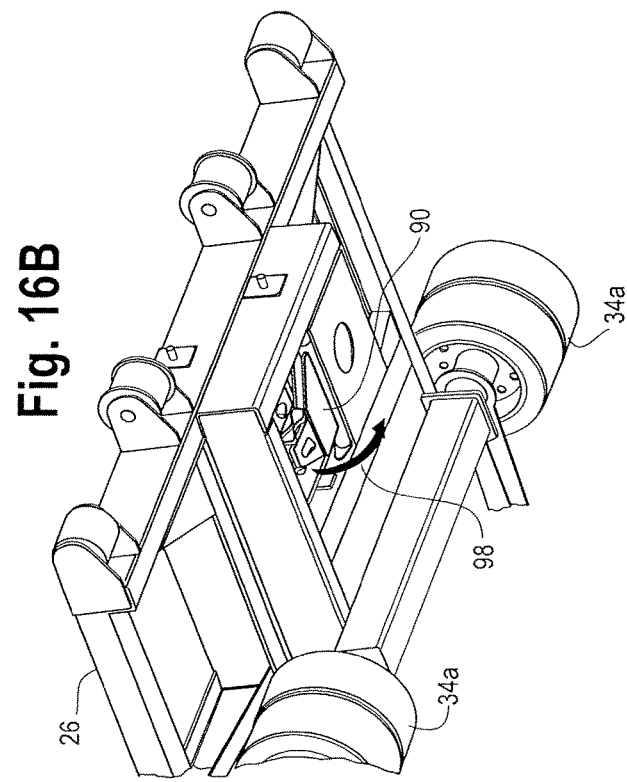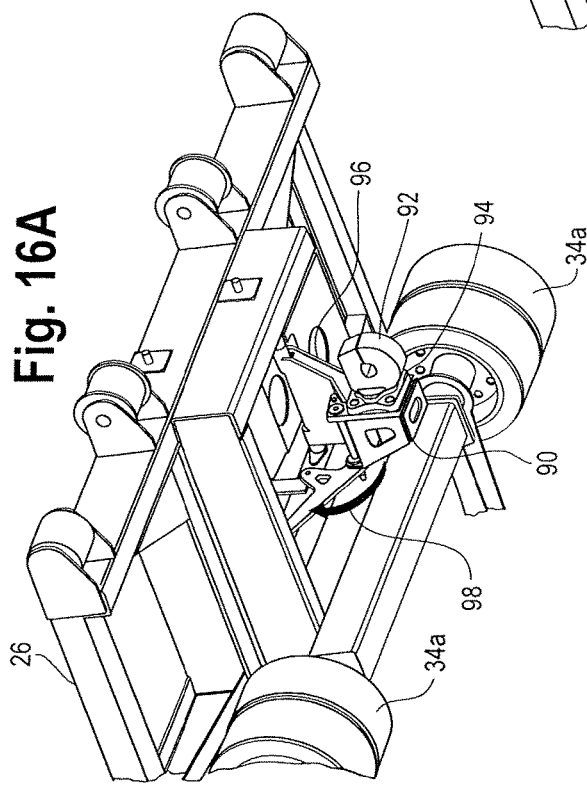

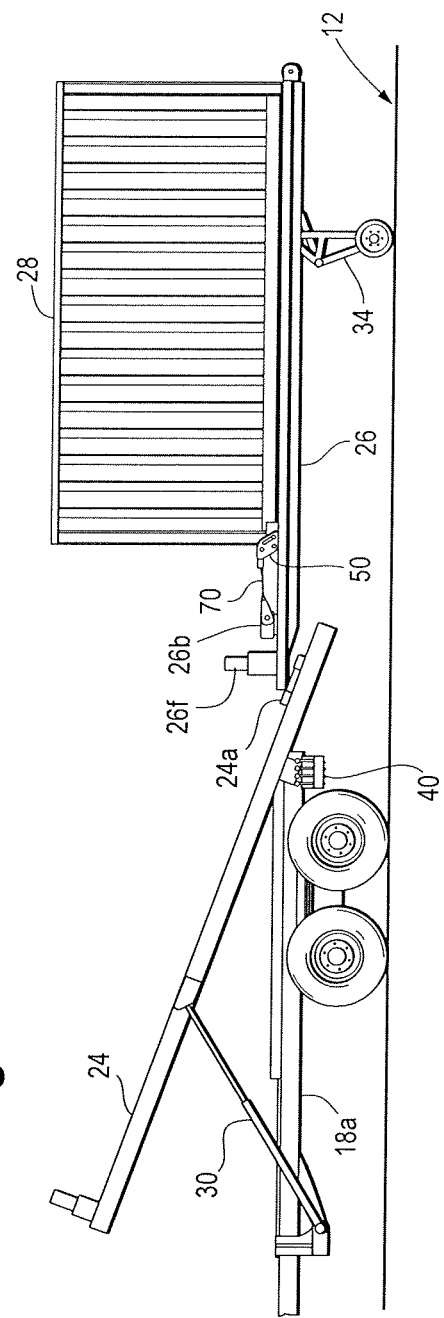

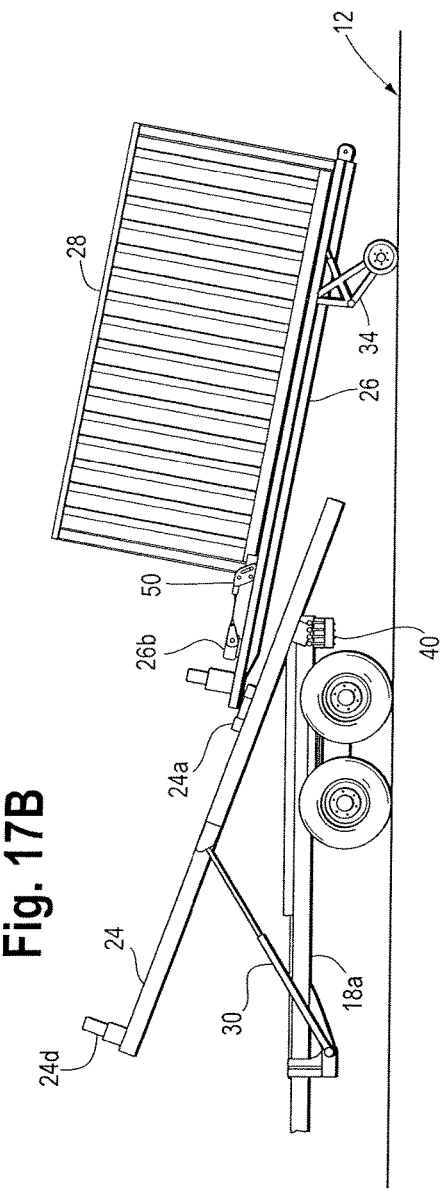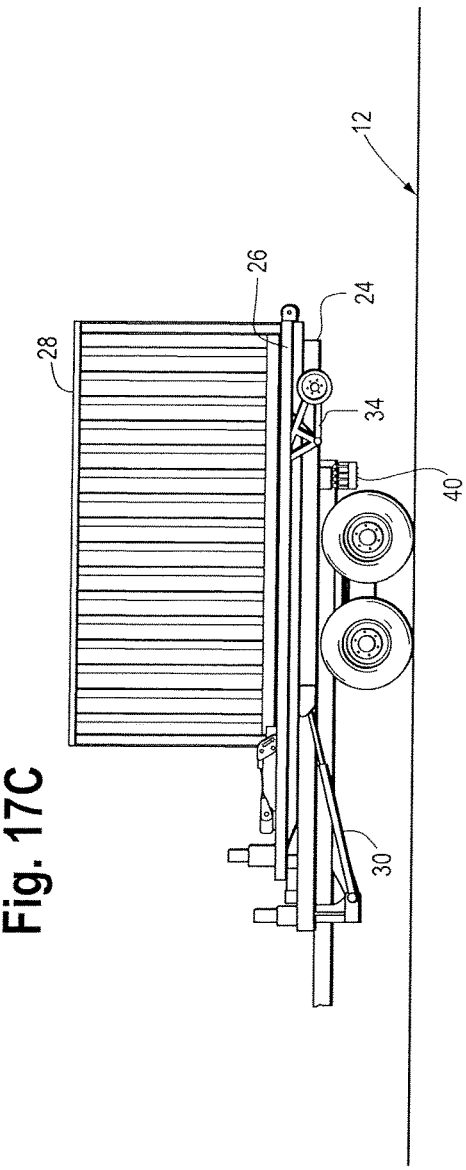

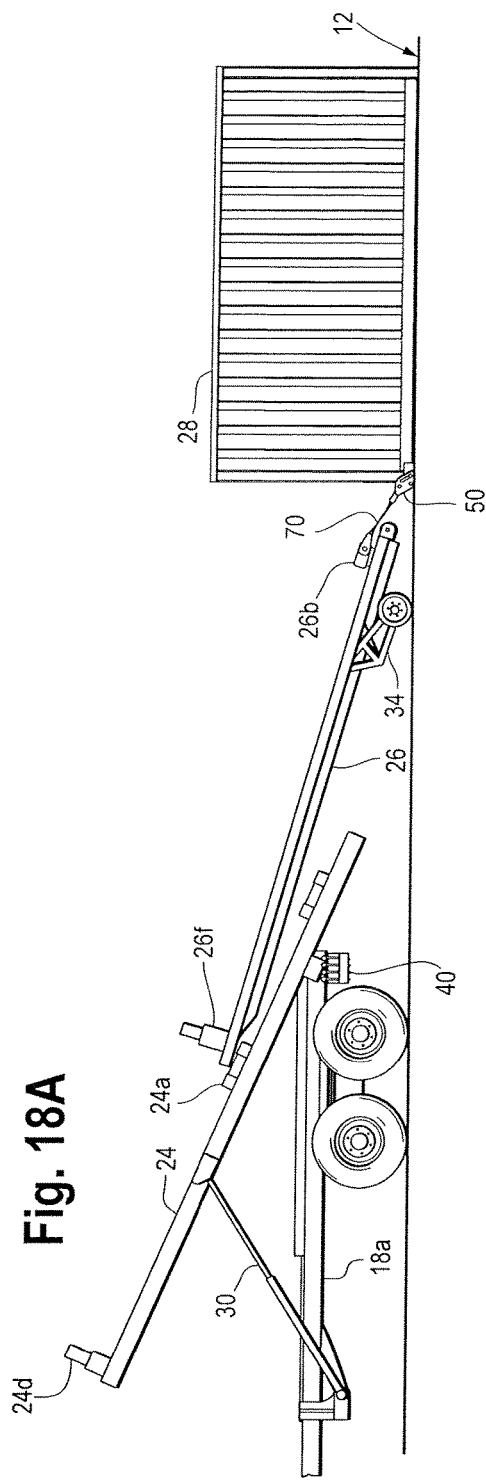
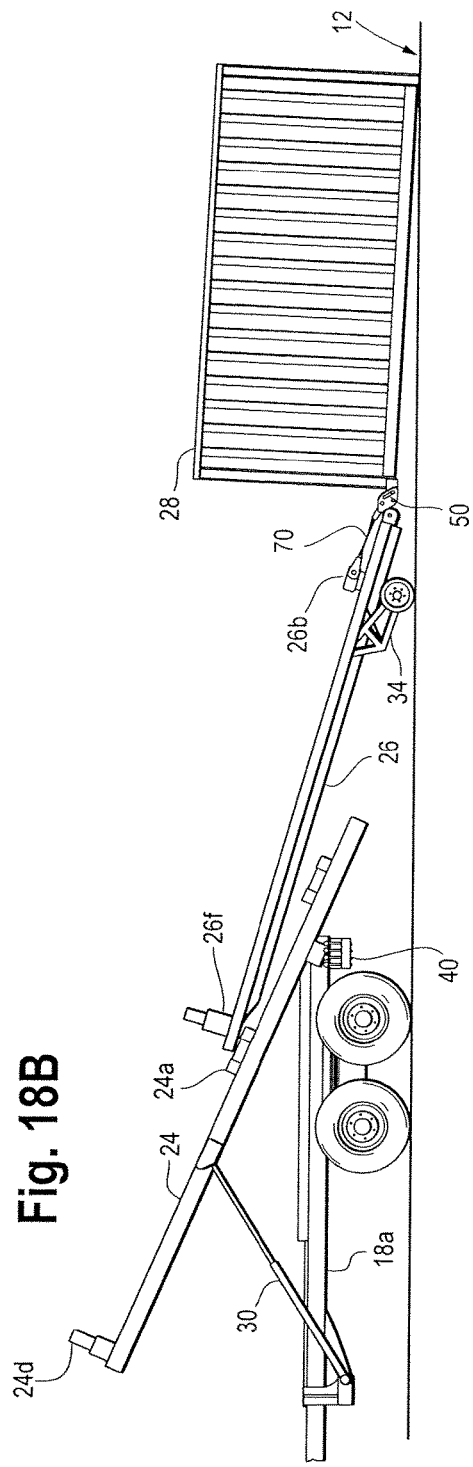

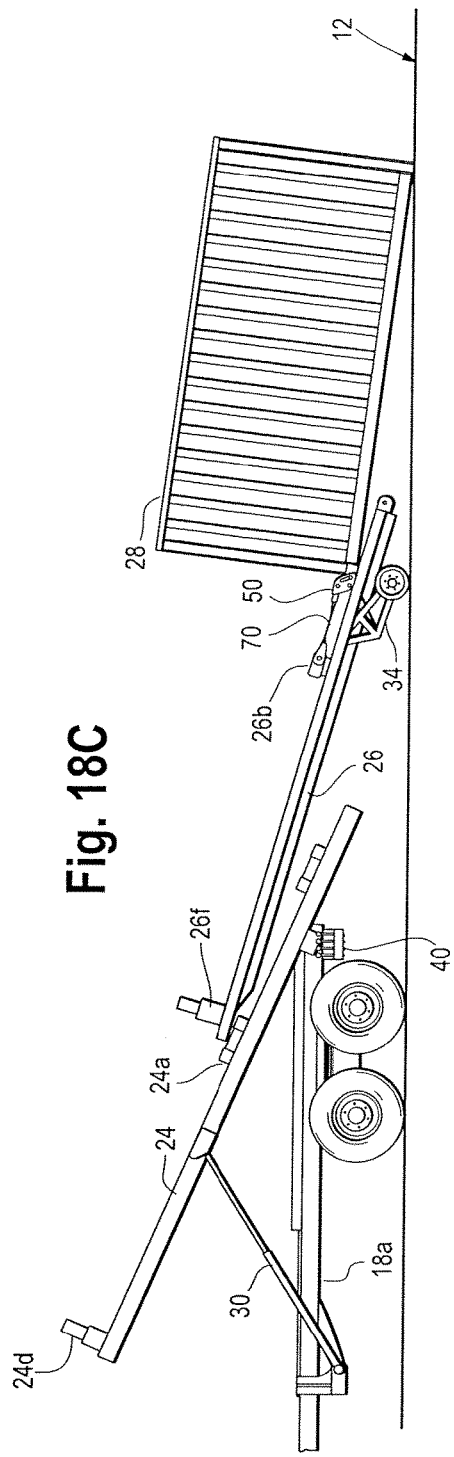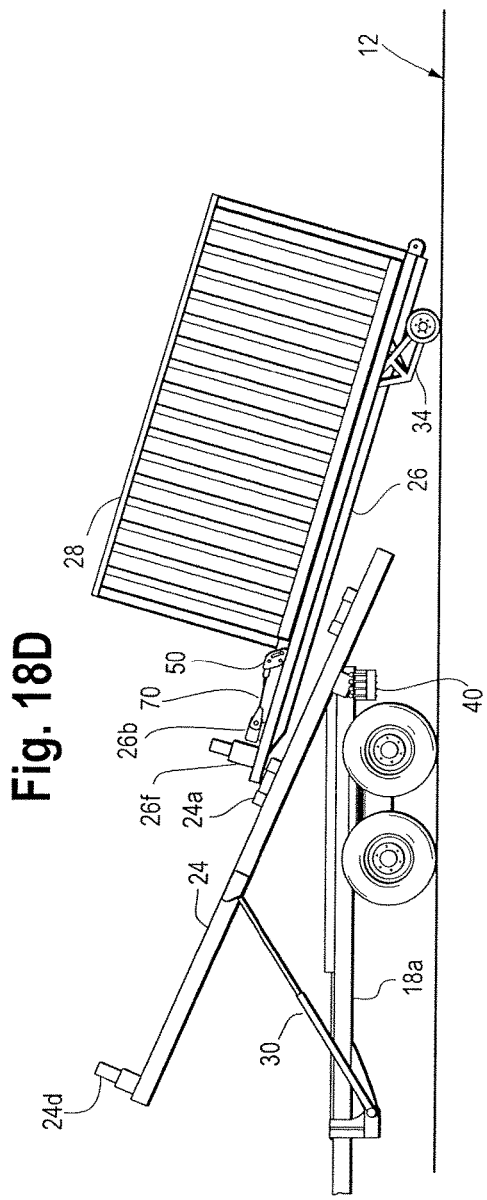

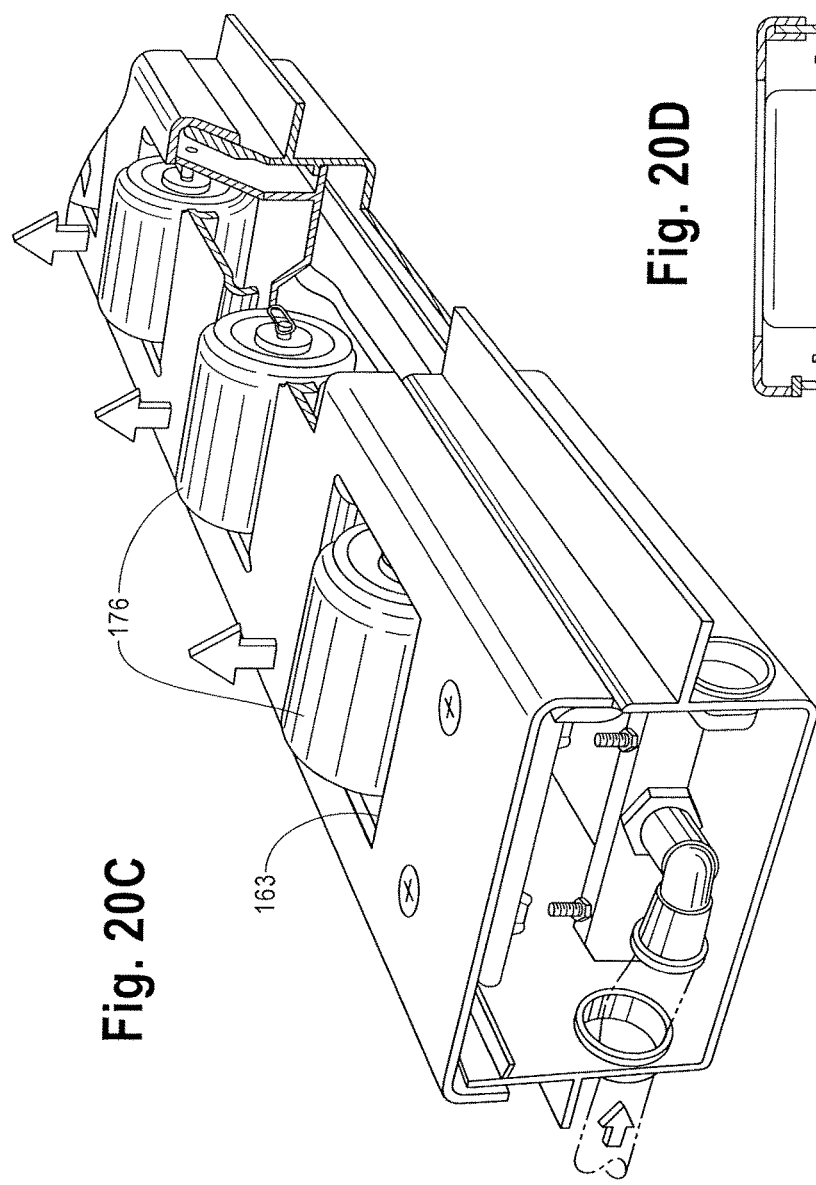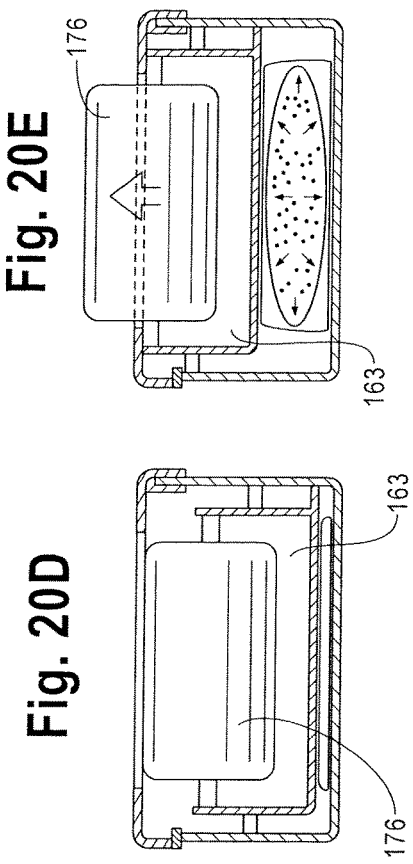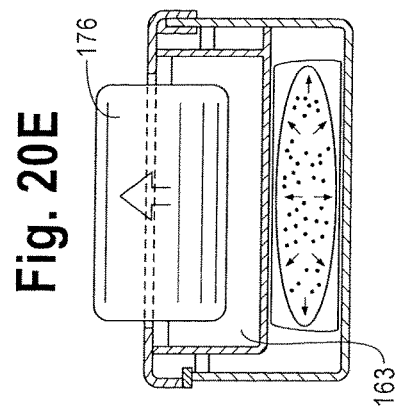

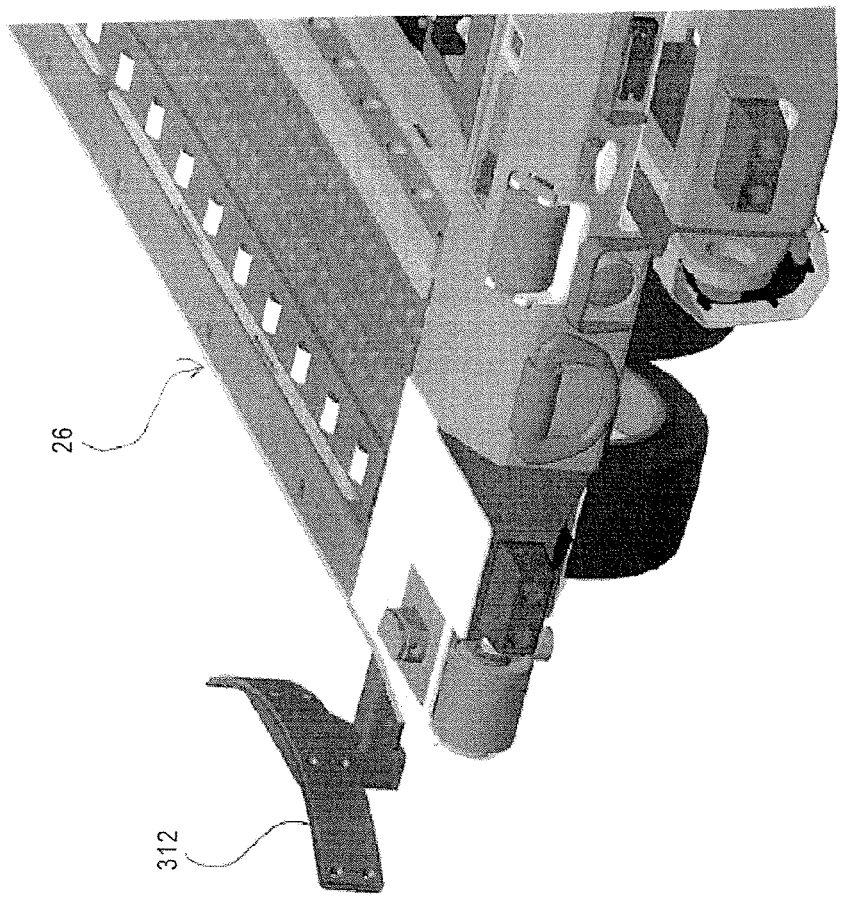

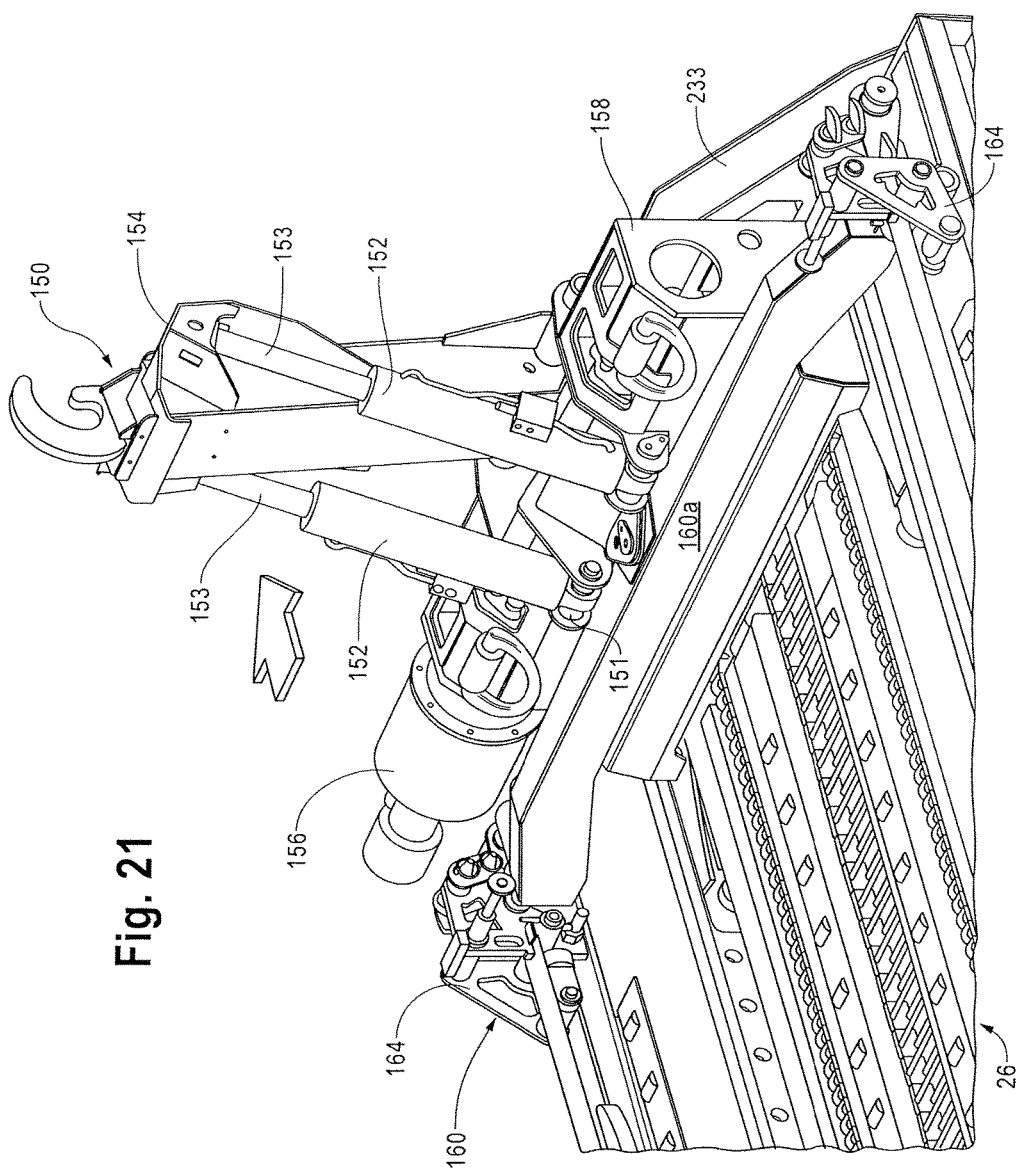

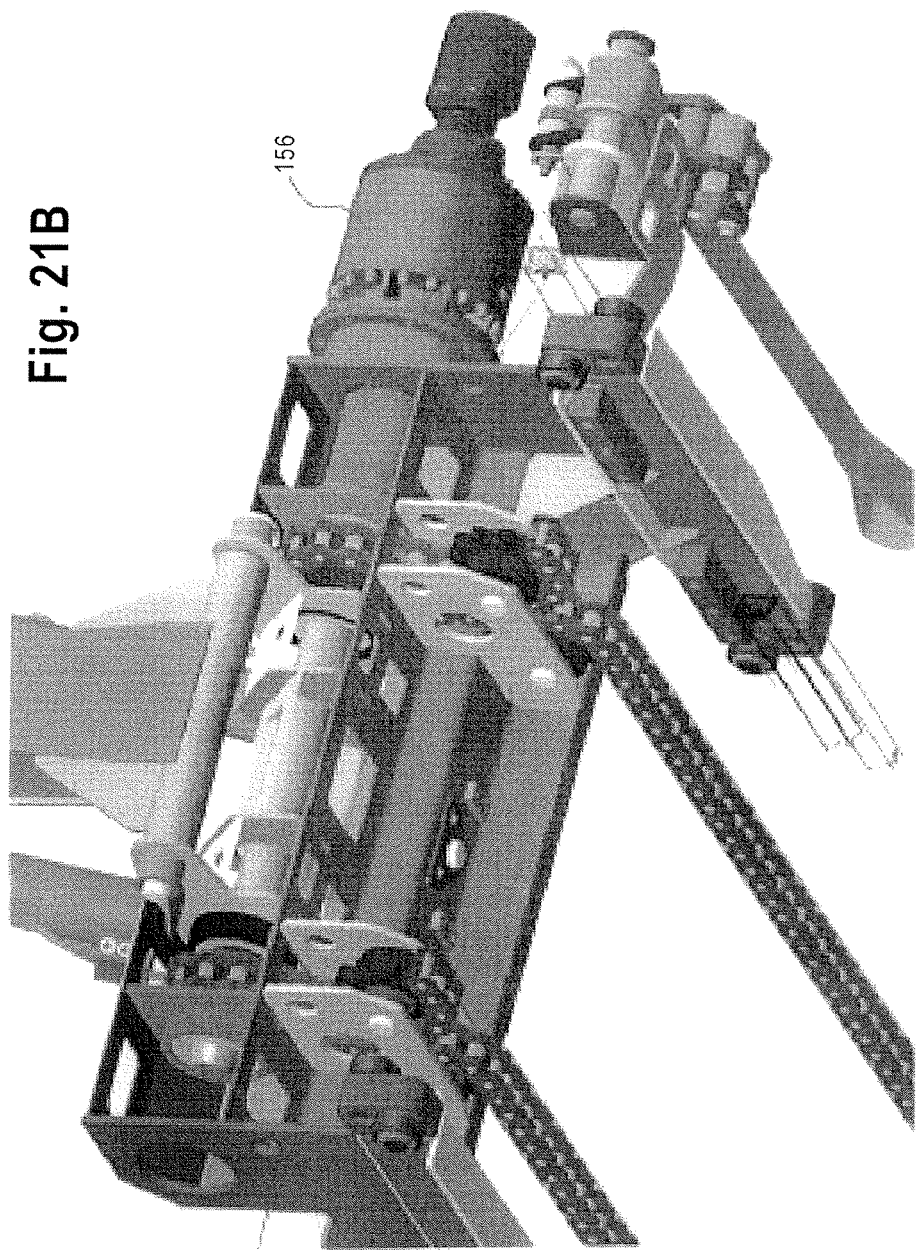

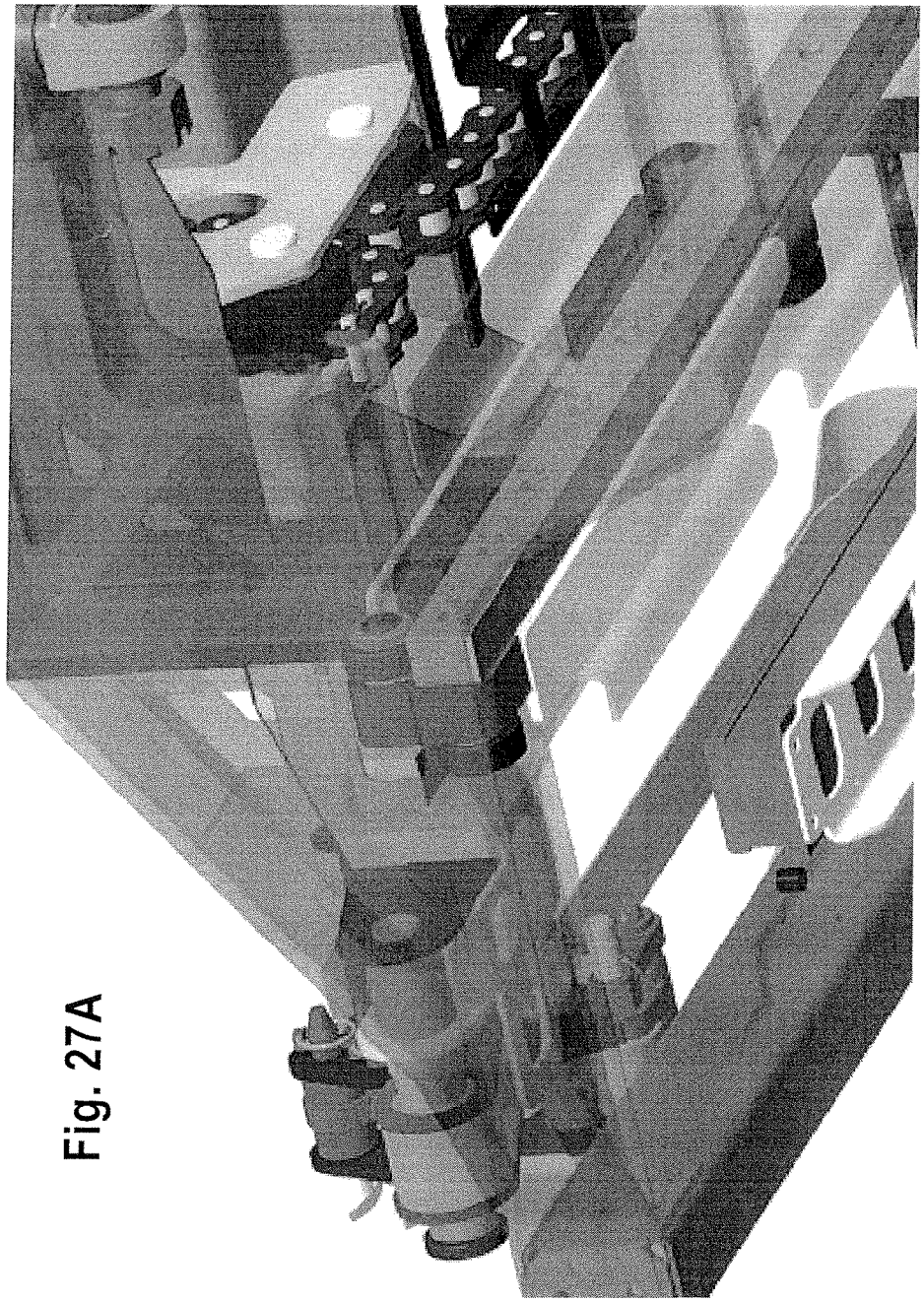

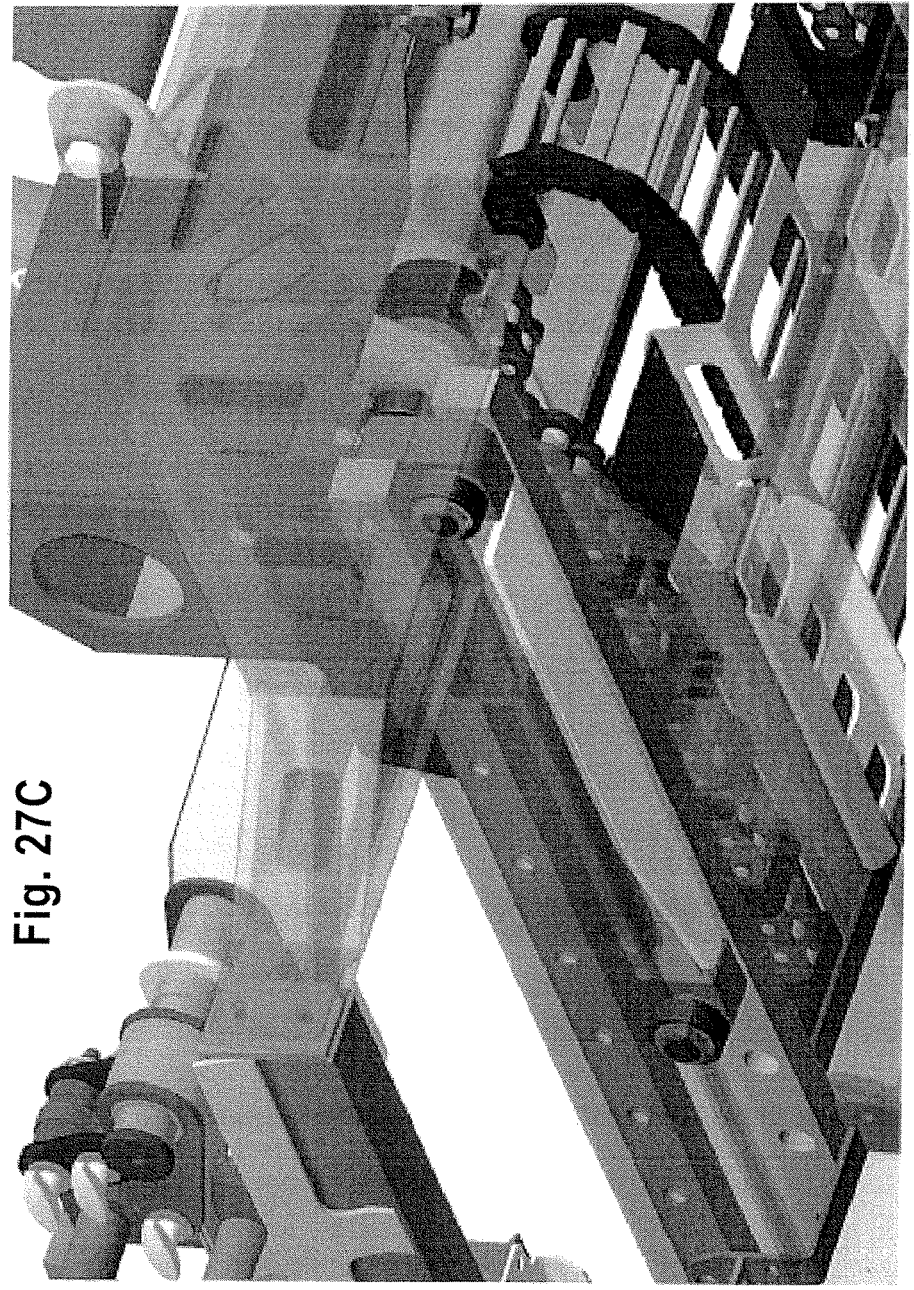

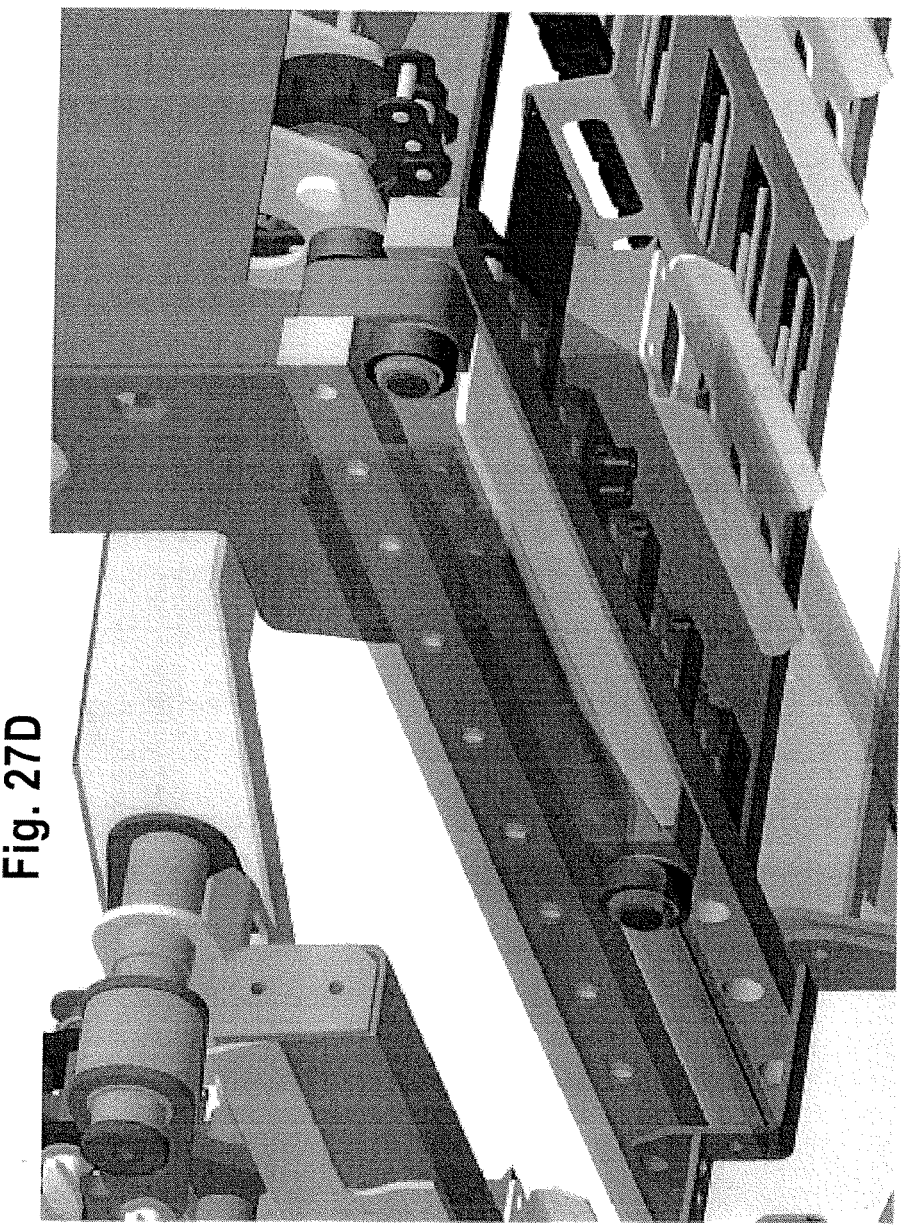

TILTLOADER FOR TRANSFERRING CARGO

PRIORITY CLAIM

This application is a divisional of, and claims priority from, U.S. Ser. No. 12/749,092, now U.S. Pat. No. 8,459,925 ("the parent case").

COLOR DRAWING STATEMENT

Pursuant to 37 CFR §1.84(a)(2)(iii), the file of this patent contains at least one drawing executed in color. Copies of this patent with color drawings will be provided by the Patent and Trademark Office upon request and payment of the necessary fee.

BACKGROUND OF THE INVENTION

The present invention generally relates to an apparatus and method for transferring cargo, including transferring cargo between an aircraft and a ground transportation vehicle. The invention allows for the transferring of cargo in a number of scenarios and environments, including accounting for spatial restraints imposed by the structure of aft-loading aircraft.

Cargo transferring systems are known for transferring aircraft cargo, such as containers, equipment and vehicles, to and from ground transportation vehicles, such as trucks and trailers. Two such transferring systems are available from Stewart & Stevenson of Sealy, Tex., and are known as the Family of Medium Tactical Vehicles (FMTV) Loading Handling System and the Medium Tactical Truck Demonstrator (MTTD). These transferring systems employ L-arm hoist assemblies and/or overhead booms which require a substantial amount of overhead clearance, rendering them unsuitable for transferring aircraft cargo given the confining spatial envelope caused by the presence of the aircraft, and the elevated aircraft loading ramp. Such cargo transferring systems may also employ beds which may not load evenly with the aircraft loading ramp.

Accordingly, it would be advantageous to provide a transferring apparatus and method for quickly and efficiently transferring aircraft cargo within the spatial constraints caused by the presence of the aircraft and/or an elevated aircraft loading ramp.

SUMMARY OF THE INVENTION

The present invention may be used to transfer cargo, including transferring cargo between an aft-loading aircraft and a ground transportation vehicle, while operating within the spatial envelope of the aircraft and an elevated loading ramp. This is generally accomplished by securing and moving the cargo in a manner that allows for generally horizontal movement while the cargo is within the spatial envelope.

A preferred embodiment of the invention may include a table and a pin for moving a tilt frame and a transfer bed of a cargo transfer system. The table may be mounted on a horizontal axis and secured to the tilt frame. The table may have a first surface permitting coaxial rotation of an opposing second surface, where the opposing second surface is located on the transfer bed. The pin may extend from the table and may be secured to the transfer bed such that the first surface opposes the second surface. The table and the opposing second surface may cooperate to enable the transfer bed to be oriented generally parallel to the ground during inclination of the tilt frame.

In one preferred embodiment, a device is provided for moving a tilt frame in relation to a transfer bed. The device includes a table mounted on a horizontal axis configured to be secured to the tilt frame. The table may have a first surface configured to permit coaxial rotation of an opposing second surface located on the transfer bed. A pin (such as a spherical bearing) may extend from the table. The pin may be configured to be secured to the opposing second surface of the transfer bed. The table and the opposing second surface may be cooperatively engaged by the pin to enable the transfer bed to be oriented generally parallel to the ground during inclination of the tilt frame. The pin preferably allows the transfer bed to roll side-to-side relative to the table, while also allowing the table and the opposing second surface to cooperate to allow the transfer bed to rotate about a vertical axis coincident with the pin. The pin may be threaded and may include a threaded fastener configured to mate with the pin for rotatably securing the first and opposing second surfaces.

A mounting plate may be used to secure the device to the tilt frame using one or more risers extending from the mounting plate and one or more table supports extending down from the table, to provide a vertical separation between the table and the mounting plate, thereby facilitating clearance between the transfer bed and tilt frame.

A carriage or trolley may be provided, movable along the tilt frame, and the table may be secured to the trolley. The trolley may be chain-driven, for example.

The table may include a first meshing surface configured to be secured to a second meshing surface on the transfer bed. The table may also have one or more supports configured to pivotally turn on a horizontal axis between the mounting plate and the table, permitting the transfer bed to be oriented generally parallel to the ground during inclination of the tilt frame. The first and second meshing surfaces may be permitted to engage, to allow the transfer bed to rotate about a vertical axis coincident with the pin. The pin, such as a spherical bearing, may also be used to secure the first meshing surface to the second meshing surface. A horizontal axis may be formed by using one or more risers extending from the mounting plate and the one or more supports to provide a vertical separation between the table and the mounting plate, thereby facilitating clearance between the transfer bed and tilt frame.

In another embodiment of the invention, a method is employed for moving a tilt frame supported by a vehicle chassis in relation to a transfer bed pivotally connected to the tilt frame. The method may include the step of mounting a table for pivotable movement about a horizontal axis. The table may be secured to the tilt frame. The table may have a first surface configured to permit coaxial rotation of an opposing second surface on the transfer bed. The table is pivotable on the horizontal axis such that the transfer bed may be oriented generally parallel to the ground during inclination of the tilt frame. A pin may extend from the table. The pin may be configured to be secured to the transfer bed such that the first surface opposes the second surface. Preferably, the table and the second surface cooperate to allow the transfer bed to rotate about a vertical axis coincident with the pin. A mounting plate may be provided, and configured for securing the device to the tilt frame. The horizontal axis may be formed using one or more risers extending from the mounting plate and one or more table supports extending down from the table, to provide a vertical separation between the table and the mounting plate, thereby facilitating clearance between the transfer bed and tilt frame. Preferably, the pin also allows the transfer bed to roll side-to-side relative to the table. A trolley may be provided which is movable along the tilt frame; the table may be secured to the trolley.

In another preferred embodiment of the invention, a loading and unloading device is provided for transferring cargo between a vehicle having a chassis and a cab and a loading ramp of varying height. The device may include a tilt frame pivotally engaged to the vehicle chassis. The tilt frame may have a first end near the cab of the vehicle and a second end distal from the cab. The transfer bed may have a first end movable along an upper surface of the tilt frame. A table may be provided, and mounted on a horizontal axis configured to be secured to the tilt frame. The table may have a first surface configured to permit coaxial rotation of an opposing second surface located on the transfer bed. A pin, such as a spherical bearing, may extend from the table, or otherwise connect the transfer bed and the tilt frame. The pin may be configured to be secured to the opposing second surface of the transfer bed. An adjustable height carriage configured to support a second end of the transfer bed may also be provided. Using this device, the transfer bed may be leveled at varying heights by varying at least one of: the height of the carriage; and the height of the first end of the transfer bed by moving it along the tilt frame. The table and the opposing second surface cooperate to enable the transfer bed to be oriented generally parallel to the ground during inclination of the tilt frame. The carriage may be supported by one or more independently-moveable rear stabilizer legs enabling the transfer bed to be leveled over uneven ground. The rear stabilizer legs may be nestable or foldable under an end of the transfer bed. The tilt frame may also include an extendable boom, which may terminate in a hook fork useable for loading and unloading flat rack platforms.

The tilt frame may also include a retractable roller system to facilitate loading and unloading. When engaged, the retractable roller system may include rollers extending above a deck of the tilt frame to facilitate roll-loading of apparatus such as cargo pallets on to the deck. After loading, the rollers may be retracted from a level of the deck, such as by using air pressure, spring-loading or other means.

Other systems, methods, features, and advantages of the present invention will be apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 6A is a first perspective view of the RACI of FIG. 5 showing the open RACI positioned over one side of the corner fitting of a shipping container;

FIG. 6B is a perspective view of another side of the corner fitting of a shipping container;

FIG. 6C is a second perspective view of the RACI of FIG. 5 showing the open RACI over the corner fitting of the shipping container;

FIG. 7A is a third perspective view of the RACI of FIG. 5 showing the closed RACI over the corner fitting of the shipping container;

FIG. 7B is a fourth perspective view of the RACI of FIG. 5 showing the closed RACI over the corner fitting of the shipping container;

FIG. 8 is a side view of the closed RACI of FIG. 5, illustrating the attachment of a bracket and a strap;

FIG. 9 is a first perspective view of the RACI of FIG. 5, shown during the loading of the shipping container onto the transfer bed of FIGS. 1-4;

FIG. 13A is an exploded bottom perspective view of the meshing wheel of FIGS. 11 and 12 illustrating the connection to the transfer bed of FIG. 3;

FIG. 13B is a top perspective view of the meshing wheel of FIGS. 11 and 12 illustrating the connection to the transfer bed of FIG. 3;

FIG. 14 is a perspective view of the tilt frame and trolley of FIG. 12 in a first position on the tilt frame of FIGS. 1-4;

FIG. 15 is a perspective view of the tilt frame and trolley of FIG. 12 in a second position on the tilt frame of FIGS. 1-4;

FIGS. 16A and 16B are bottom perspective views of a retractable pintle device associated with the transfer bed of FIGS. 1-4;

FIGS. 17A-17C are sequential side views illustrating how cargo may be transferred from an aircraft, as shown in FIG. 2, to the chassis of a vehicle;

FIGS. 18A-18D are sequential side views illustrating how cargo may be transferred from the ground to the transfer bed of FIGS. 3 and 4.

FIG. 20C is a partial top and front perspective view of one roller system embodiment useable with the present invention;

FIGS. 20D and 20E show the air-loaded retractable roller capability of the roller system shown in FIG. 20C;

FIG. 20F is a partial rear perspective view of an embodiment of the upper rear deck of the transfer bed;

FIG. 21 is an enlarged top and side perspective view of a front end of the transfer bed showing an extendable boom, according to the embodiment of FIG. 19;

FIG. 21B is a partial front perspective view of the gear box for driving the adjustable boom shown in FIG. 21A;

FIGS. 27A-27F are various partial, front perspective views showing preferred embodiments of the trolley/adjustable boom roller or drive system;

The components in the drawings are not necessarily to scale, emphasis instead being placed upon clearly illustrating the principles of the present invention. In the drawings, like reference numerals designate corresponding parts throughout the several views.

DEFINITION OF CLAIM TERMS

Figure 1:
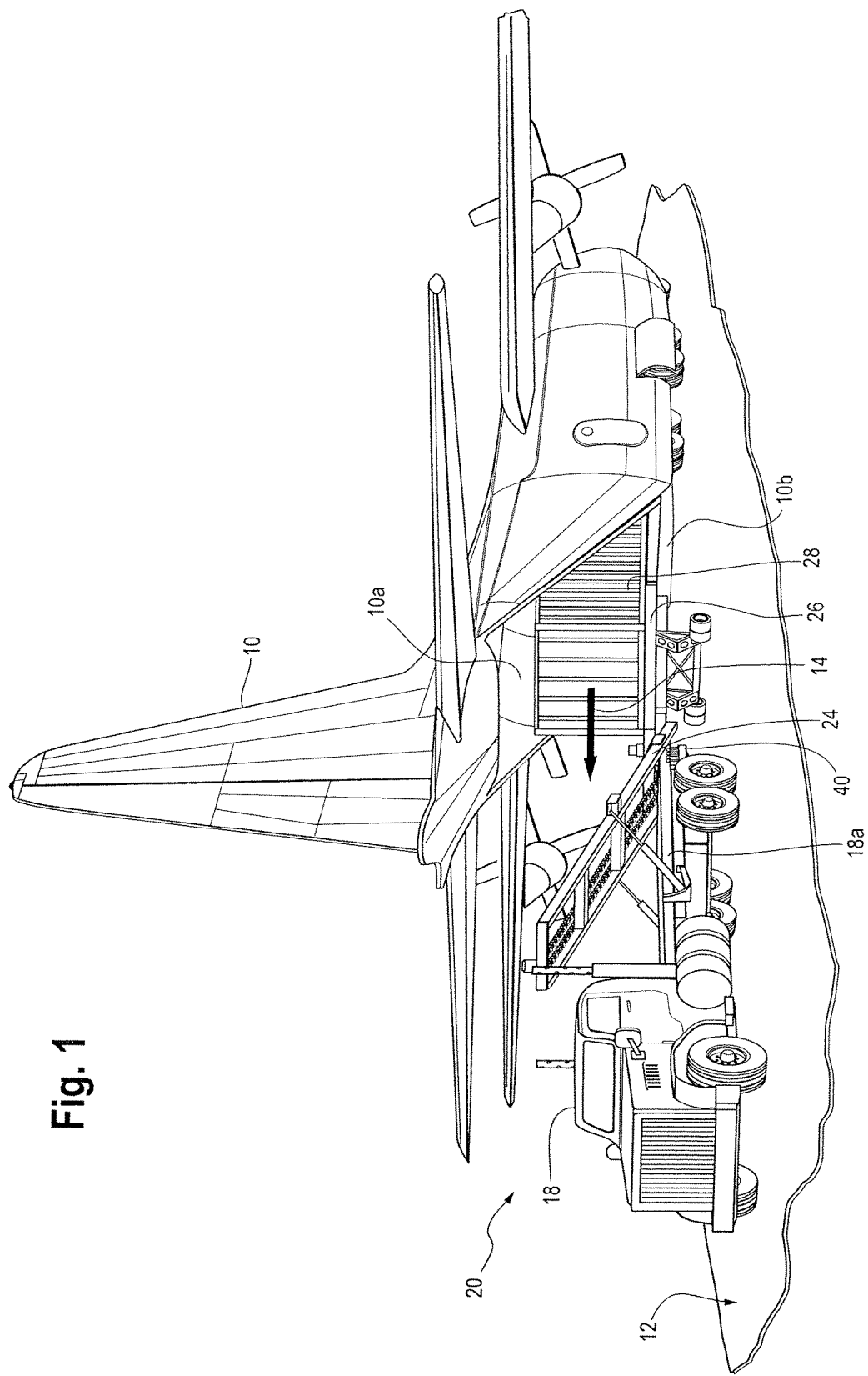
FIG. 1 is a perspective view of an aircraft having an aft-loading ramp, and a preferred embodiment of the transferring system of the present invention.

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

In the claims, the "tilt frame" is any structure capable of supporting cargo loaded on a transfer bed, and that pivots on a vehicle chassis.

In the claims, "transfer bed" is any structure capable of height adjustment that supports cargo being transferred from a loading ramp or dock, and that may at least partially overlie and be supported by a tilt frame.

In the claims, "meshing surface" refers any surface allowing interactive engagement between a tilt frame and a transfer bed such that the transfer bed may be disposed in a horizontal position generally parallel to the ground even as the tilt frame is inclined relative to the ground.

DETAILED DESCRIPTION OF THE PREFERRED EMBODIMENTS

Set forth below is a description of what are believed to be the preferred embodiments and/or best examples of the invention claimed. Future and present alternatives and modifications to the preferred embodiments are contemplated. Any alternatives or modifications which make insubstantial changes in function, in purpose, in structure, or in result are intended to be covered by the claims of this patent.

The present invention generally relates to an apparatus and method for transferring cargo. The invention allows for the transfer of cargo in a number of scenarios and environments. Applications for the invention include transferring cargo between an aircraft and a ground transportation vehicle, and from the ground to the ground transportation vehicle. The invention provides for accomplishing such tasks within the spatial constraints imposed by military aircraft. For example, central-body loading military aircraft, such as the C-17 and C-130, provide problematic spatial constraints associated with an aft-loading ramp beneath the tail portion of the aircraft. The present invention addresses the problems associated with the prior art L-arm hoist assemblies and/or overhead booms which have been found to undesirably conflict with the spatial constraints associated with aircraft such as the C-17 and C-130.

Preferred embodiments of the present invention are provided below in which the cargo is transferred to and from the aircraft in a more horizontal manner. These new methods and systems for transferring cargo may use a number of new devices and steps, such as but not limited to: (1) a new device and method for engaging the cargo (see the RACI description and FIGS. 5-10); (2) a new device and method for transferring the cargo between the aircraft and ground transportation vehicle, including a tilt frame and retractable transfer bed; (3) a new device and method for leveling the transfer bed; and (4) a new device and method for engaging and moving the transfer bed in relationship to the chassis of the ground transportation vehicle.

Figure 3:
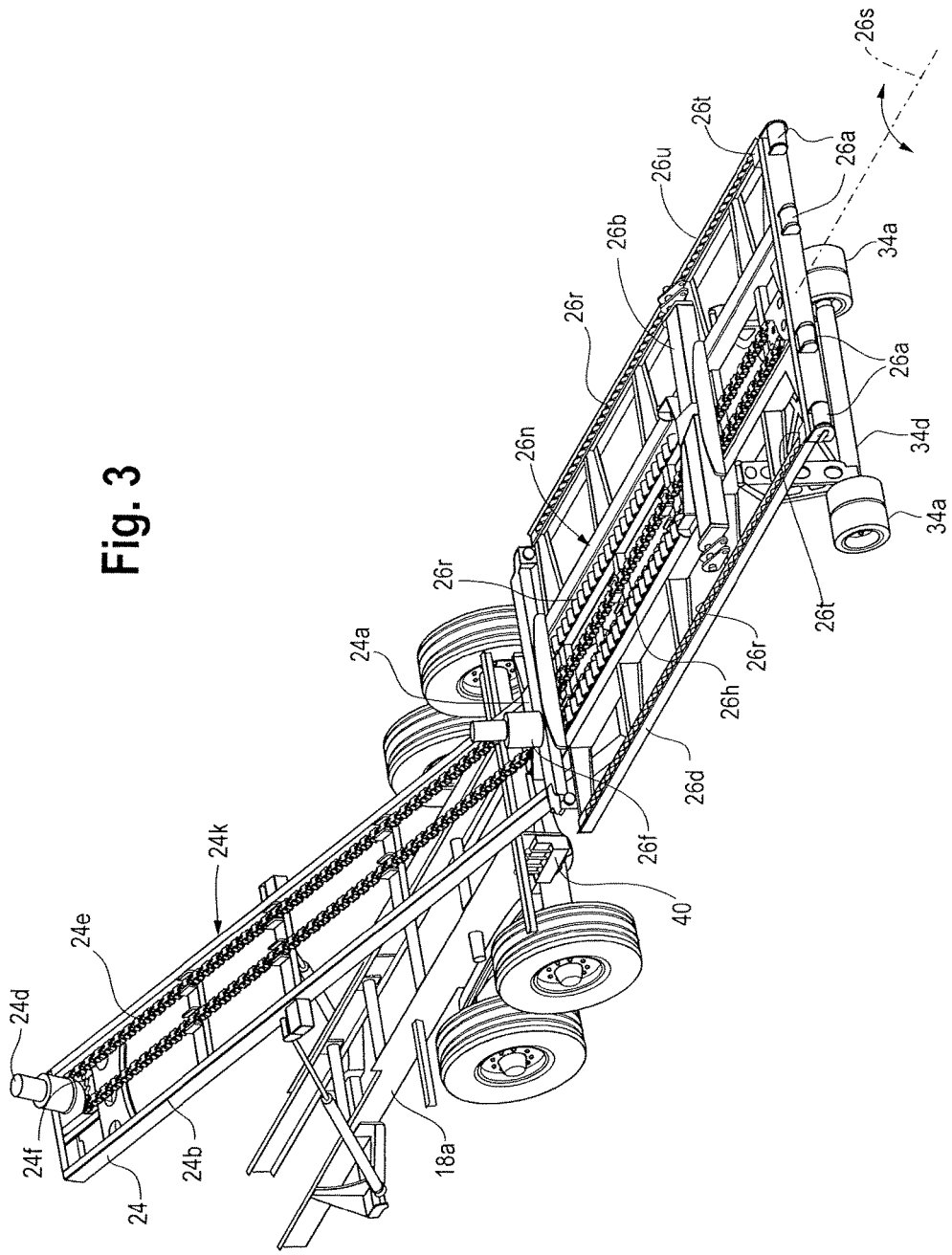
FIG. 3 is a perspective view of the tilt frame and transfer bed portions of the transferring system of FIGS. 1 and 2.
Figure 4:
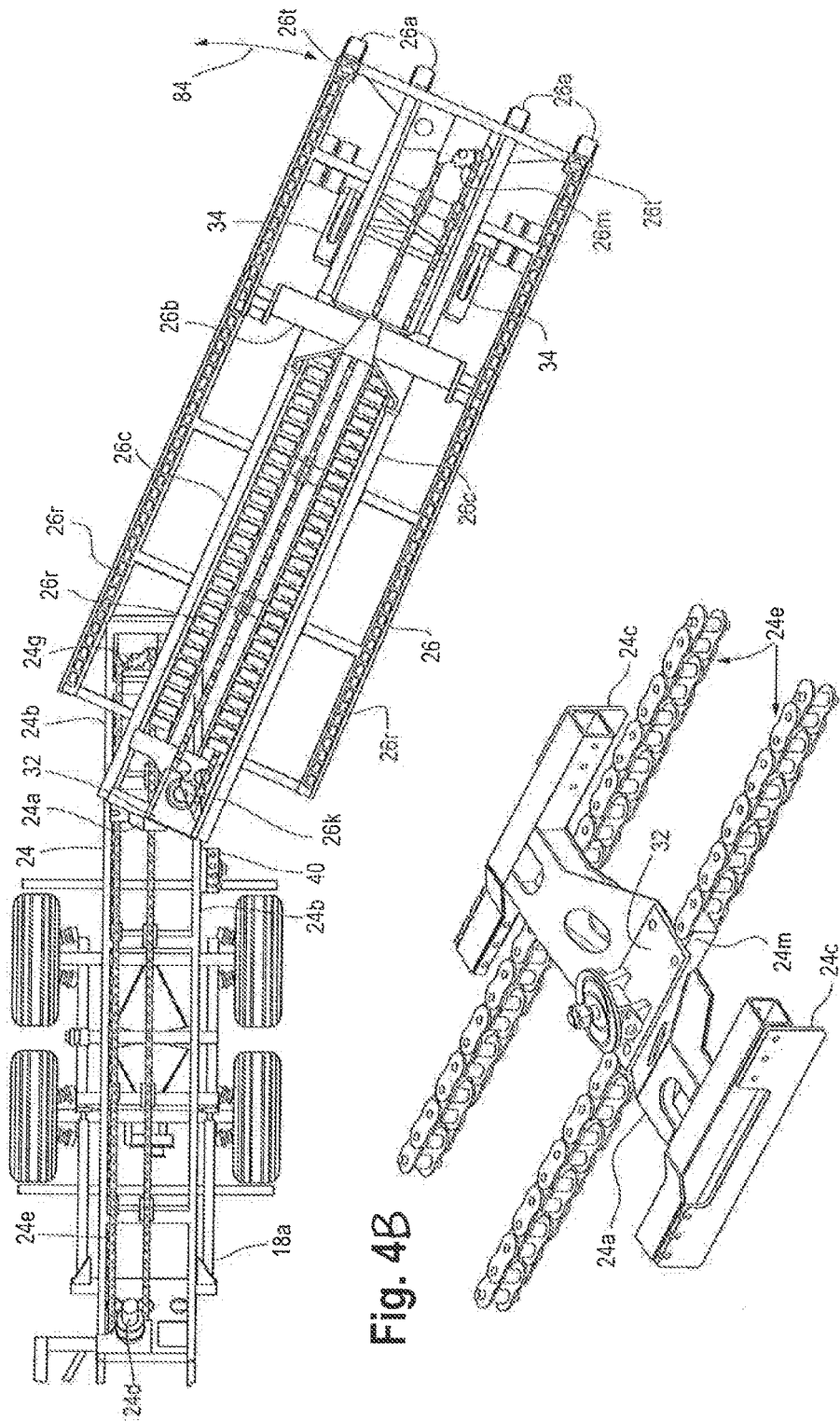
FIG. 4A is a top view of the transferring system illustrating the lateral flexibility associated with the use of a tilt frame trolley having a meshing wheel (partially hidden) which connects to the transfer bed.
FIG. 4B is a top and side perspective view of the tilt frame trolley.
Figure 5:
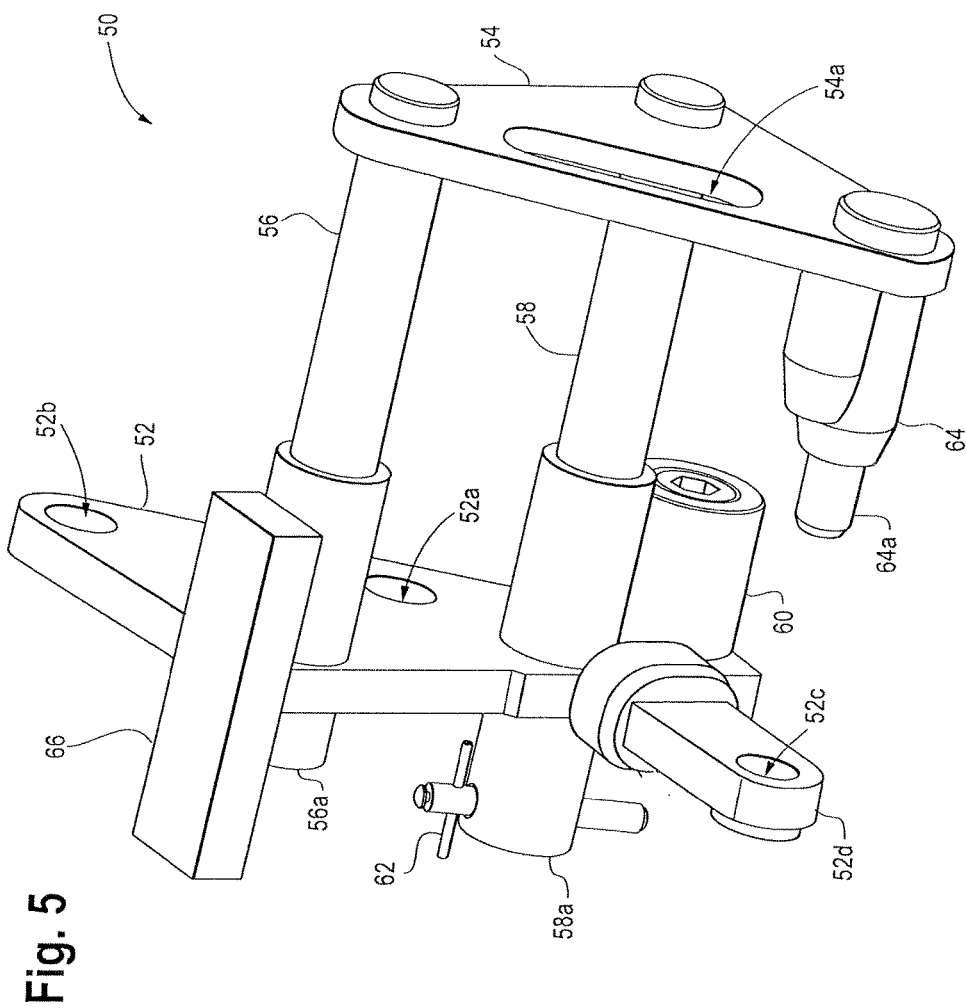
FIG. 5 is a perspective view of a preferred Rapid Attach™ container interface (RACI) device of the transferring system of the present invention.
Figure 10:
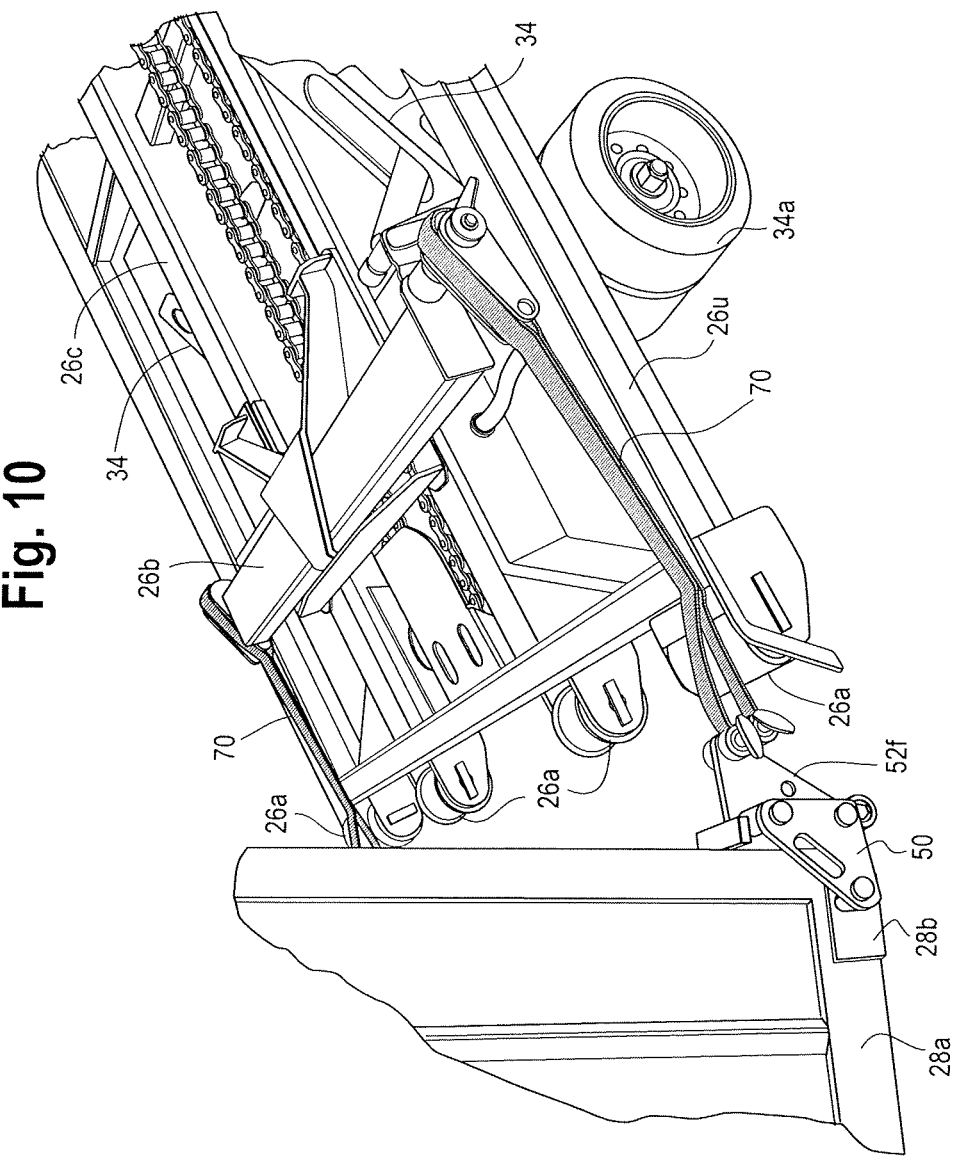
FIG. 10 is a second perspective view of the RACI of FIG. 5, shown during the loading of the shipping container onto the transfer bed of FIGS. 1-4.

In brief, cargo 28 (FIG. 1) may be loaded onto vehicle chassis 18a from any location using the retractable deck combination formed by tilt frame 24 and transfer bed 26. Cargo 28, which may take the form of a shipping container 28a (FIG. 2), may be engaged using a Rapid Attach™ container interface (RACI) mechanism 50 (FIG. 5). RACI 50 and cargo 28a may be pulled onto transfer bed 26 via straps 70 (FIGS. 8-10) and transfer bed trolley 26b (FIG. 3). Transfer bed 26, with cargo 28a, may be pulled onto tilt frame 24 using meshing wheel 32 (FIGS. 4, 11-13B) that pivotally attaches transfer bed 26 to tilt frame 24. Meshing wheel 32 may be mounted on tilt frame trolley 24a (FIGS. 2 and 4) and secured to a forward portion of transfer bed 26 (as shown in FIG. 4A). Tilt frame trolley 24a and meshing wheel 32 may then travel forward and/or upward on an upper surface 24k (FIG. 3) of tilt frame 24 until cargo container 28a rests on vehicle chassis 18a. Cargo 28 may also be transferred between vehicle 18 and aircraft loading ramp 10b (FIG. 2) using the retractable deck combination formed by tilt frame 24 and transfer bed 26, where transfer bed 26 is adjustable to the height of loading ramp 10b.

Provided below is a more detailed description of the cargo transfer system, including subsections providing more detailed descriptions of RACI 50, meshing wheel 32, and various methods of operating the cargo transfer system. This description and the references to "preferred" and "new" devices and steps are intended to provide context and information associated with the cargo transfer system, without limiting the claims which are set forth separately after this detailed description.

Cargo Transfer System

Figure 2:
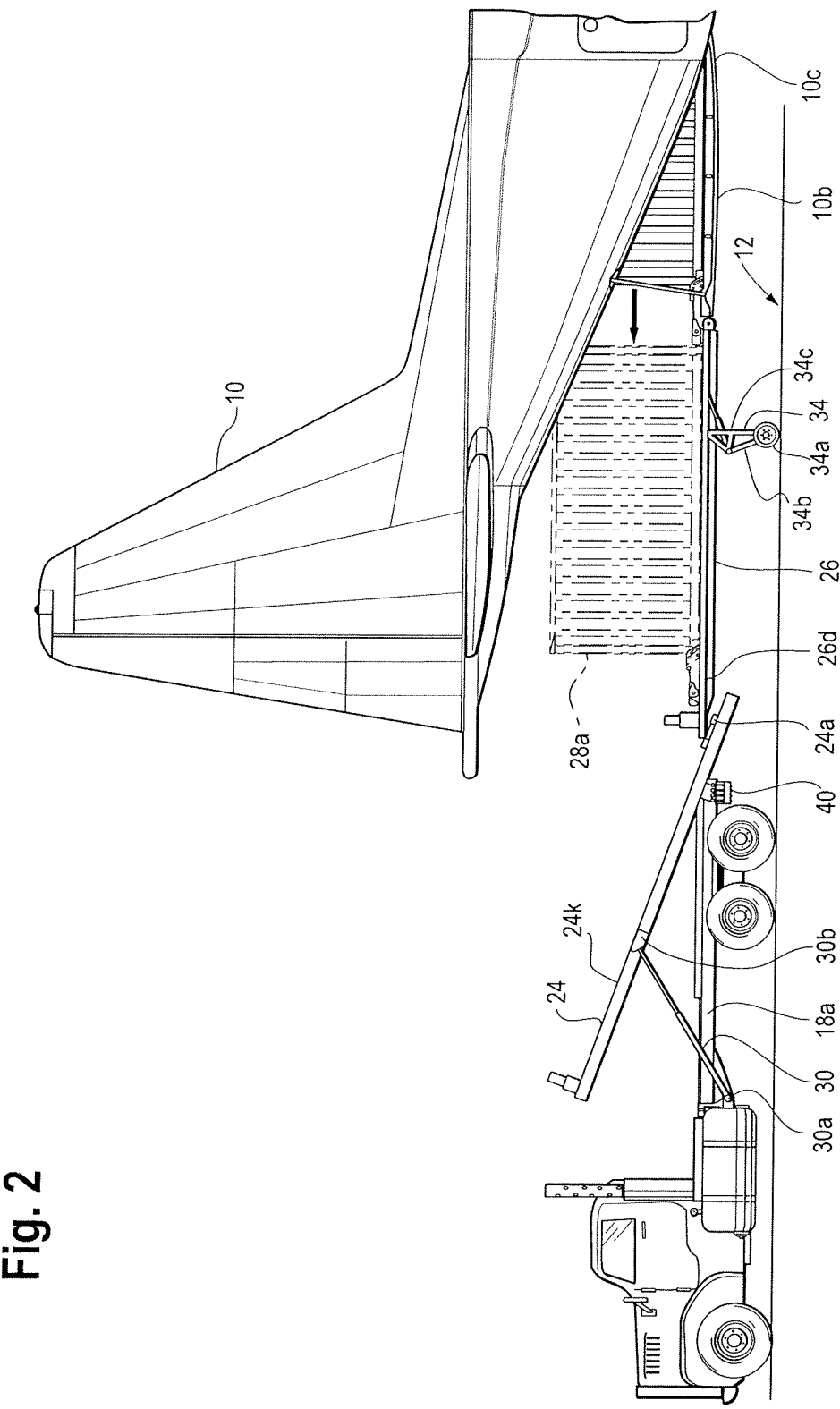
FIG. 2 is a side view of the transferring system and the aft-loading aircraft of FIG. 1, including the tilt frame and transfer bed portions of the transferring system.

Referring initially to FIGS. 1 and 2, an aircraft 10 and portions of transferring system 20 are shown. FIG. 1 shows an aircraft 10 having a loading ramp 10b, in this case an aft-loading ramp, vehicle 18, and portions of the transferring system 20, including tilt frame 24 and transfer bed 26. In FIG. 1, cargo 28 is shown moving in the direction indicated by arrow 14 from the cargo bay 10a of aircraft 10 to transfer bed 26.

FIG. 2 shows a side view of aircraft 10 on the ground 12 and shows tilt frame 24 and transfer bed 26 in a typical configuration for the transfer of cargo 28 between aircraft 10 and vehicle chassis 18a. In some embodiments, transferring system 20 includes vehicle chassis 18a, tilt frame 24, and transfer bed 26. In additional embodiments, transferring system 20 includes methods for transferring cargo 28 from aircraft 10, to transfer bed 26, and then onto vehicle chassis 18a.

Referring to FIG. 2, loading ramp 10b is hinged to aircraft 10 at hinge point 10c. Loading ramp 10b may be used to access cargo bay 10a of aircraft 10. The floor (not shown) of cargo bay 10a may be approximately 32 inches above ground 12 in the case of a C-130 aircraft, and approximately 62 inches above ground 12 in the case of a C-17 aircraft, so it is preferable to provide a loading device which can accommodate a loading ramp having heights of at least this variance. Cargo bay 10a may include "roll on/roll off" rollers (not shown but known to those having ordinary skill in the art) for efficient handling of cargo pallets. Loading ramp 10b may be hydraulically operated and may also include features for efficiently transferring cargo, such as the "roll on/roll off" rollers.

The distance between loading ramp 10b and the top of cargo bay 10a presents spatial impediments to the efficient loading and unloading of aircraft 10. In addition, the distance between ground 12 and the tail portion of aircraft 10 presents spatial impediments to the efficient loading and unloading of aircraft 10. For example, in the case of a C-130 aircraft, unloading equipment with a winch and hook is problematic because there is only about 102 inches of usable distance between the end of ramp 10b and the top of aircraft bay 10a when ramp 10b is level with the floor of cargo bay 10a (allowing 6 inches of clearance at the top of the bay 10a). Also, in the case of a C-130 aircraft, the usable width of the bay is approximately 105 inches (allowing 6 inches on each side and allowing for the permanently installed rail system (not shown) in the bay 10b). In the case of a C-17 aircraft, there is only about 142 inches of usable distance between the end of ramp 10b and the top of aircraft bay 10a when ramp 10b is level with the floor of cargo bay 10a (allowing 6 inches of ceiling clearance). Also, in the case of a C-17 aircraft, the usable width of the bay is approximately 196 inches (allowing 6 inches of wall clearance). Although the dimensional impediments are described herein in regard to aircraft 10, similar dimensional impediments exist in regard to transporting cargo to and from other transporting crafts, such as, but not limited to, other aircraft, ships, and trucks.

Ideally, cargo 28 may be transferred between aircraft 10 and vehicle chassis 18a where neither the cargo nor the transferring system exceed a spatial envelope defined by: (a) a ceiling at the height of the transom above ramp 10b; (b) a width slightly less than the width of ramp 10b, for example, in the case of a C-130, a width of 105 inches which is slightly less than the width of the ramp on a C-130, with the width co-centered with ramp 10b; and (c) a length sufficient to allow clearance, and a margin for error, to prevent cargo 28 and equipment for transferring the cargo, from striking aircraft 10. For example, in the case of a C-130, the length sufficient to allow clearance is 30 feet from hinge point 10c to the rear of aircraft 10. Ideally, both cargo 28 and the equipment used to transfer cargo 28 remain within the spatial envelope as cargo 28 is transferred between aircraft 10 and vehicle chassis 18a.

Transferring system 20 may be used to efficiently load and unload cargo 28 to and from aircraft 10 and other cargo transports while remaining within the spatial envelope. Vehicle chassis 18a may be a variety of vehicle chasses, such as virtually any Class 7 or Class 8 truck chassis, such as but not limited to the Family of Medium Tactical Vehicle (FMTV) chassis. Vehicle chassis 18a may be mounted on any vehicle 18 capable of sustaining the weight of cargo 28 and transferring system 20.

As shown in FIG. 2, tilt frame 24 may be attached at a generally forward portion to chassis 18a via cylinder 30 between attachment point 30a and attachment point 30b. Cylinder 30 may raise and lower tilt frame 24 such that tilt frame 24 pivots near the back of vehicle chassis 18a. In addition to using a cylinder 30, tilt frame 24 may be attached to vehicle chassis 18a in a variety of manners, such as but not limited to, those described in U.S. Pat. Nos. 5,779,431; 6,817,825; and 6,520,736, which are each fully incorporated herein by reference.

Tilt frame 24 may be attached to transfer bed 26 in a manner that allows the generally forward portion of transfer bed 26 to travel along the upper surface 24k of tilt frame 24. One manner of allowing such travel is by using a tilt frame trolley 24a and an associated meshing wheel 32 (FIG. 11) as described in greater detail below with regard to FIGS. 4 and 11-15.

Again referring to FIG. 2, transfer bed 26 may include adjustable carriage 34. Adjustable carriage 34 may include rear wheels 34a, support struts 34b, and support posts 34c. The height of adjustable carriage 34 may be adjusted through a number of adjustable mechanisms, such as but not limited to, a hydraulic mechanism that changes the distance between the upper surface 26n (see FIG. 3) of transfer bed 26 and rear wheels 34a. The adjustable mechanism permits cargo 28 transfer to/from several different heights of loading platforms, not limited to various aircraft loading ramps 10b. If desirable, the wheels 34a on different sides of the transfer bed 26 may act independently for the purpose of leveling the transfer bed 26 with ramps 10b about the roll axis 26s (see FIG. 3). For example, the independent adjustment mechanisms may be used to level the upper surface 26n with the ramp 10b on ground 12, even if the ground 12 is uneven.

Referring now to FIGS. 3 and 4, vehicle chassis 18a, tilt frame 24, and transfer bed 26 are shown. Tilt frame 24 allows transfer bed 26 and cargo 28 to be transferred to and from vehicle chassis 18a without exceeding the spatial envelope. Tilt frame 24 may include tilt frame trolley 24a (also see FIGS. 14-15) that may travel on tilt frame tracks 24b. Trolley 24a may be moved on tracks 24b using tilt frame motor 24d, chain 24e, first gear 24f, and second gear 24g. Meshing wheel 32 (also see FIGS. 11-15) may be secured to trolley 24a using conventional fasteners, such as bolts. Motor 24d provides a motive force which is communicated to trolley 24a via chain 24e, first gear 24f and second gear 24g. As trolley 24a travels on the upper surface 24k of tilt frame 24, the transfer bed 26, to which trolley 24a is secured, moves onto, or off of, tilt frame 24.

Transfer bed 26 allows cargo 28 to be transferred to and from aircraft 10 without exceeding the spatial envelope, and allows for cargo 28 to be transferred at the same level as loading ramp 10b. Transfer bed 26 may include transfer bed trolley 26b that may travel on transfer bed tracks 26c. Trolley 26b may be moved on tracks 26c using transfer bed motor 26f, chain 26h, third gear 26k, and fourth gear 26m. Motor 26f provides a motive force which is communicated to trolley 26b via chain 26h, third gear 26k, and fourth gear 26m. When loaded, movement of trolley 26b towards tilt frame 24 results in movement of cargo 28 toward tilt frame 24. Transfer bed end rollers 26a allow for the smooth transition of cargo between ground 12 and transfer bed 26. Transfer bed 26 may also include imbedded retractable "roll on/roll off" rollers 26r for moving cargo 28 on the upper surface 26n of transfer bed 26. Transfer bed imbedded rollers 26r may also allow for the smooth transition of cargo between ramp 10b and transfer bed 26. Transfer bed 26 may also include screw-down twist or tandem locks 26t, as shown in FIG. 3, to interface with an ISO corner fitting, for securing cargo 28 to the transfer bed 26.

In FIG. 3, it can be seen that adjustable carriage 34 may have a rear wheel 34a on each end of axle 34d. Although shown extended in FIGS. 2 and 3, adjustable carriage may also be retracted under transfer bed 26 when cargo 28 is being moved from ground 12 to transfer bed 26 (see FIG. 10). Control panel 40 may provide controls for operating tilt frame motor 24d, transfer bed motor 26f, and adjustable carriage 34. A remote wireless control (not shown) may also be used to operate the transferring system 20.

Rapid Attach Device

FIGS. 5-10 show a preferred mechanism, Rapid Attach™ container interface (RACI) 50, for quickly connecting and disconnecting cargo 28 to the rear of transfer bed 26 so that cargo 28 may be moved, for example from ground 12 to transfer bed 26. In short, RACI 50 enables corner fittings 28b (FIG. 6A) of shipping container 28a, or other cargo 28, to be quickly attached to transfer bed 26. Corner fittings 28b may be as specified by the American National Standards Institute/International Organization for Standardization (ANSI/ISO). Such fittings are available from suppliers such as Tandemloc, Inc., of Havelock, N.C., and are known to those having ordinary skill in the art.

RACI 50 may include a bracket 72 (FIG. 8) that provides an attachment point for the use of straps 70 to load container 28a onto transfer bed 26. Straps 70 may be made of nylon (e.g., 3-ply or 4-ply) or another strong, yet flexible, material. Due to its design and construction, it has been found that RACI 50 may be attached and locked to the shipping container in less than ten seconds, and each mechanism of a pair may weigh only about 35-40 pounds.

FIG. 5 shows RACI 50 in an open position. RACI 50 may include first plate 52, second plate 54, first bar 56, first sleeve 56a, second bar 58, second sleeve 58a, RACI wheel 60, first pin 62, second pin 64 and brace 66. End portion 64a and second pin 64 are designed to conform to the generally oval apertures of corner fitting 28b (see FIGS. 6A and 6B).

First plate 52 may include several apertures, including first aperture 52a, bracket aperture 52b, an aperture in which first sleeve 56a may be affixed, an aperture in which second sleeve 58a may be affixed, an aperture configured for supporting RACI wheel 60, and a pin aperture 52c. Pin aperture 52c is located on an insert portion 52d of plate 52. Pin aperture 52c is configured to accept second pin 64 when RACI 50 is closed.

First plate 52 may be constructed from a variety of materials, such as but not limited to, high tensile steel such as ASTM A514B. First plate 52 may be machined to include the features described herein. Flat plates may be laser cut, while pins are cast or stock materials. First plate 52 may be constructed from materials, and constructed in a manner, to provide sufficient structure integrity to perform the operations described herein.

Second plate 54 may include carrying aperture 54a, an aperture in which first bar 56 may be affixed, an aperture in which second bar 58 may be affixed, and an aperture in which second pin 64 may be affixed. Second plate 54 may be constructed from similar materials, and in a similar manner, as described above in regard to first plate 52.

First bar 56 may be attached to second plate 54 on a first end, while the second end is configured to adjustably slide within and/or through first sleeve 56a and first plate 54. Bar 56 may be formed from stock round materials, such as but not limited to ASTM A 108, C-1045 cold-drawn bar, milled to shape as shown and described herein, and provided with a chamfered machined end. Of course, for mass production purposes, tooling and steel casting of parts may be done. First bar 56 may inserted through an aperture in second plate 54, and welded in place, for example.

Using similar principles, second bar 58 may be attached to second plate 54 on a first end, while the second end is configured to adjustably slide within and/or through second sleeve 58a and first plate 54. Second bar 58 may include a plurality of apertures configured to accept first pin 62. Second bar 58 may be constructed from similar materials, and in a similar manner, as described above in regard to first bar 56. Second bar 58 may also be attached to second plate 54 in a manner similar to that described above for first bar 56.

First pin 62 may pass through second sleeve 58a and the plurality of apertures of second bar 58. First pin 62 may be configured to provide a secure fit in order to maximize the structural integrity of RACI 50 when RACI is subject to the stresses associated with the operation of RACI 50 as described below.

Brace 66, which may be cold drawn, may be configured to lie flush against shipping container 28a during the operation of RACI 50, as described below, in order to provide lateral stability. Brace 66 may be attached to first plate 52 by welding, for example. Brace 66 may be used to keep RACI 50 from rotating vertically.

RACI wheel 60 (FIG. 5) may be configured, and attached to first plate 52, in a manner that provides sufficient mechanical integrity to support RACI 50, and cargo 28, in the operation of RACI 50 as described below. RACI wheel 60, which may be steamed and hardened bar stock, may be made so that the bolt head is counter-sunk and flush with the edge and recessed into the roller, so that it does not rub on the transfer bed tracks 26c (FIG. 4A) or other portions of the transfer system 20.

Second pin 64 is configured to allow an end portion to pass through a first aperture 28c (FIG. 6A) on corner fitting 28b when RACI 50 is closed. Insert portion 52d is designed to pass through a second aperture 28d (FIG. 6B) on corner fitting 28b when RACI 50 is closed. When the RACI 50 is closed on a corner fitting 28b, second pin 64 mates with insert portion 52d of first plate 52 in the internal hollow portion of the corner fitting 28b.

One preferred method of operating RACI 50 is now described in reference to FIGS. 5-10. In one step, the RACI 50 is placed near corner fitting 28b of container 28a. RACI 50 is placed near corner fitting 28b in an open position, such as the open position shown in FIGS. 5, 6A and 6C. Insert portion 52d of first plate 52 is inserted into the second aperture 28d of corner fitting 28b, with RACI wheel 60 oriented toward ground 12, and second pin 64 in line with first aperture 28c of corner fitting 28b, as shown in FIGS. 6A and 6C.

In another step, RACI 50 is closed by applying a force on second plate 54 towards cargo 28, as shown by arrows 68 in FIGS. 6A and 6B. The force may be applied to second plate 54 through carrying aperture 54a and/or via the exterior surface of second plate 54. The force applied to second plate 54 results in first bar 56 and second bar 58 passing, respectively, through first sleeve 56a and second sleeve 58a, and results in second plate 54 moving towards first plate 52. The force is applied until an end portion 64a of second pin 64 enters first aperture 28c of corner fitting 28b and mates in aperture 52c.

In another step, RACI 50 is locked in place. RACI 50 may be locked by placing first pin 62 through second sleeve 58a and one of the plurality of apertures (not shown) of second bar 58 as shown in FIG. 7A. FIGS. 7A and 7B show RACI 50 in a closed and locked position.

In another step, bracket 72 is attached to RACI 50 through bracket aperture 52b as shown in FIG. 8. In another step, strap 70 is attached to transfer bed trolley 26b (FIGS. 3 and 4) and bracket 72. In another step, cargo container 28b is moved when transfer bed trolley 26b pulls on strap 70, resulting in a force being applied to bracket 72, and then to RACI 50, resulting in a force being applied to container cargo 28b.

In another step, cargo container is pulled onto the upper surface 26n of transfer bed 26. As shown in FIGS. 6C and 8, first plate 52 may include a sloped surface 52f to allow RACI 50 to easily pass to upper surface 26n after passing over rollers 26a. As a pulling force is applied to strap 70, sloped surface 52f comes in contact with rollers 26a of transfer bed 26. Further pulling on straps 70 results in RACI 50 traveling over roller 26a and onto the upper surface 26n of transfer bed 26.

Meshing Wheel Device

FIGS. 11-15 show a preferred mechanism, a meshing wheel 32 and tilt frame trolley 24a, for pivotally connecting transfer bed 26 to tilt frame 24, and moving transfer bed 26 in relationship to tilt frame 24. Trolley 24a and meshing wheel 32 enable transfer bed 26 to be lowered from tilt frame 24 in a flexible manner that allows for the efficient loading of cargo 28 onto transfer bed 26 and chassis 18a, whether cargo 28 is on the ground 12 or on loading ramp 10b.

Referring now to FIGS. 11 through 13B, meshing wheel 32 may include mounting plate 32a, mounting apertures 32b, mounting risers 32c, arcing table 32d, table supports 32e, pin 32f, pin nut 32g, securing plates 32h, and grease fittings 32m. Mounting plate 32a and apertures 32b may be used to secure meshing wheel 32 to tilt frame trolley 24a (FIG. 12) using conventional fastening methods, such as but not limited to nuts and bolts. For example, meshing wheel 32 may be mounted on trolley 24a in a variety of ways such as, but not limited to, placing four (4) bolts, for example grade eight (8) bolts, through mounting apertures 32b and trolley 24a, and securing the bolts with compatible nuts.

Mounting risers 32c and table supports 32e may be interlaced (shown in FIGS. 11 and 13A) and pivotally affixed with securing plates 32h, in order to create a rocking axle shown by dashed line 80 (FIG. 12), allowing in-line movement of arcing table 32d (as shown by arrow 82) in relation to mounting plate 32a. Pin 32f and pin nut 32g may be used to secure meshing wheel 32 to transfer bed 26 (FIG. 13B). Thus, transfer bed 26 may be mounted on tilt frame trolley 24a by passing pin 32f through transfer bed 26 and placing pin nut 32g on pin 32f.

Arcing table 32d includes meshing surface 32k. Transfer bed includes meshing surface 26q (FIG. 13A). Meshing surfaces 32k and 26q allow the transfer bed 26 to move laterally, as shown by arrow 84 in FIG. 4A, in conjunction with the inline movement permitted by rocking axle 80. Grease fittings 32m allow grease to be placed between the meshing surfaces 32k and 26q.

Figure 11:
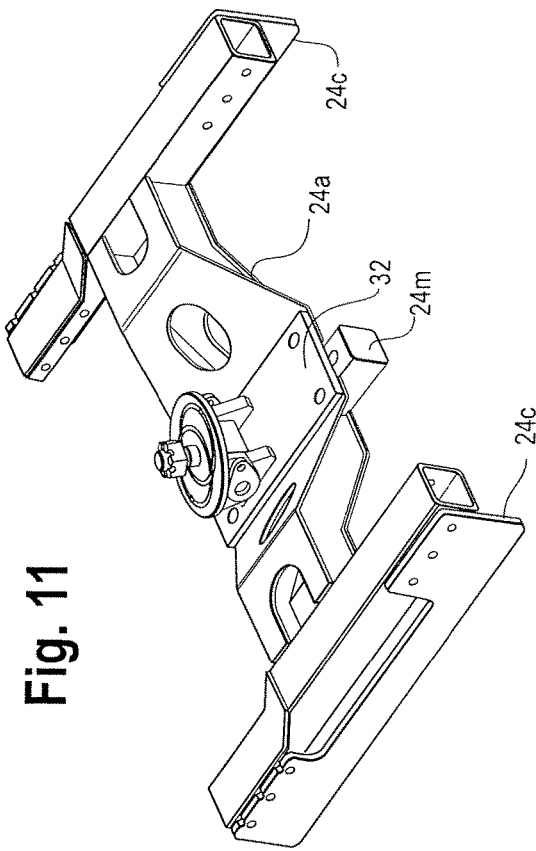
FIG. 11 is a top perspective view of the meshing wheel of FIG. 4A.

Referring to FIG. 11, tilt frame trolley 24a may include side plates 24c. Side plates 24c may be configured to follow tilt frame trolley tracks 24b (FIG. 3). Tilt frame trolley 24a is also connected to chain 24e (FIG. 3) using a master link and/or a link bar 24m or any convenient method for affixing the chain 24e to the tilt frame trolley 24a in a manner that allows tilt frame trolley 24a to be moved along tracks 24b using motor 24d (FIGS. 3 and 4). Thus, a first end 26d of transfer bed 26 may be moved on tracks 24b between the ends of tilt frame 24 using motor 24d.

The transfer system 20 may also include a quick detach system for rapidly disengaging the transfer bed 26 from the vehicle chassis 18a, such as by using a quick-disconnect, pull-pin (not shown).

Figure 12:
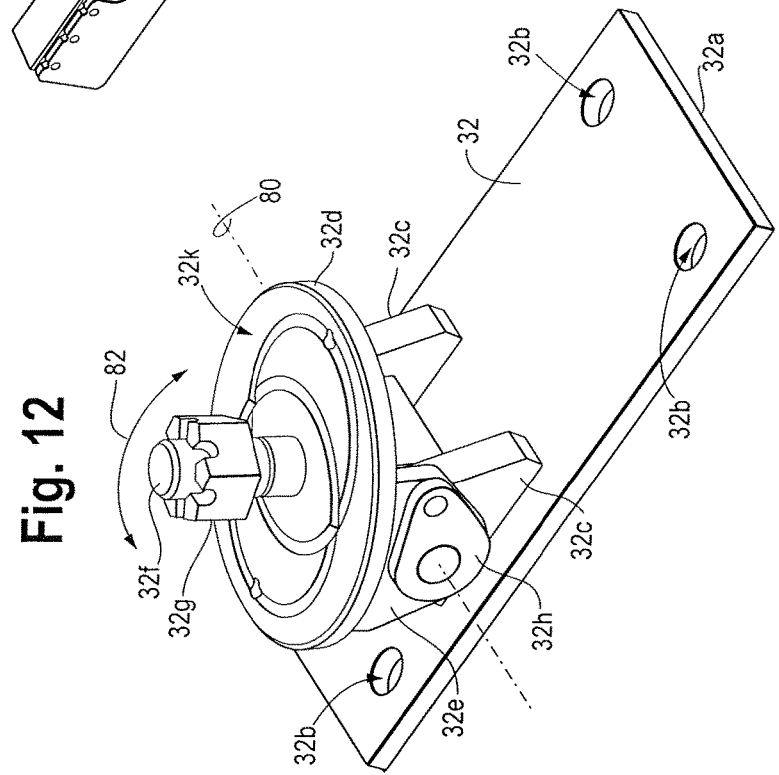
FIG. 12 is a top perspective view of the meshing wheel on the trolley of FIG. 4A.
Figure 19:
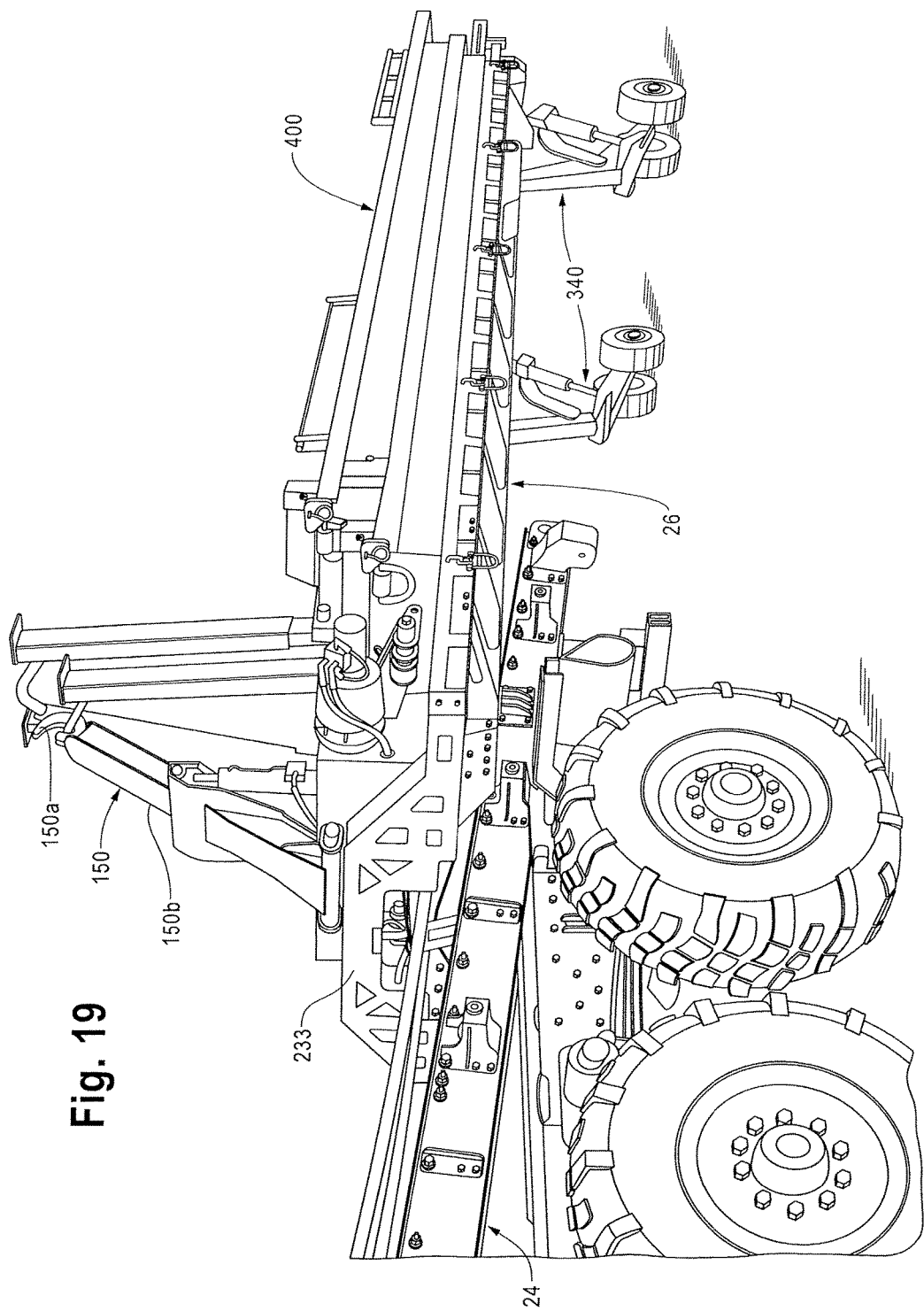
FIG. 19 is a side and front perspective view of an alternative embodiment of the tilt loader of the present invention showing a rear end of the tilt frame and the transfer bed located at a rear portion of the tilt frame.

The arrangement described herein allows transfer bed 26 to pivot in at least two manners. The first manner in which transfer bed 26 may pivot is inline with chassis 18a as arcing table 32d pivots in line with chassis 18a and mounting plate 32a as transfer bed 26 is raised or lowered on the upper surface 24k of tilting frame 24, i.e., transfer bed 26 may pivot upon the rocking axle shown by dashed line 80 (FIG. 12). The second manner in which transfer bed 26 may pivot is that transfer bed 26 may pivot in the lateral directions indicated by arrow 84 in FIG. 4A, i.e., transfer bed 26 may pivot upon an axis defined by pin 32f.

FIGS. 14 and 15 show the movement of tilt frame trolley 24a on tilt frame 24. In FIG. 14, trolley 24a is located near a distal end (from the cab of vehicle 18) of tilt frame 24. In FIG. 15, trolley is located closer to the cab of vehicle 18. Trolley 24a moves from the position shown in FIG. 14 to, and from, the position shown in FIG. 15, through the movement of chain 24e about first gear 24f (FIG. 3) and second gear 24g (FIGS. 4A, 14 and 15). As chain 24e moves, trolley 24a moves along tracks 24b.

Pintle Device

FIGS. 16A and 16B show a preferred mechanism, a pintle device 90, for towing a trailer. Pintle device 90 may be retractable as shown by arrow 98. Pintle device 90 may be retractable, at least in part, to minimize interference while transfer bed 26 is being lowered from tilt frame 24 and while transfer bed 26 is positioned for transferring cargo 28, such as shown in FIG. 18A.

Pintle device 90 may include hook 92, plate 94, and hinged support 96. Hinged support 96 allows pintle device 90 to be folded into transfer bed 26 such that hinged support 96 is flush with the bottom surface of transfer bed 26, and held in place with a removable pin. It may also be convenient to locate the pintle device 90 so that it is integrated into the rear stabilizers, and so that it is both retractable and telescoping.

System Operation

Referring now to FIGS. 17A, 17B, and 17C, one preferred method of practicing the invention is described in sequential views. FIG. 17A shows cargo 28 on transfer bed 26. In FIG. 17A, transfer bed 26 is horizontal as it might be after receiving cargo 28 from loading ramp 10b (FIGS. 1 and 2) where transfer bed 26 is level with loading ramp 10b. FIG. 17B shows transfer bed 26 with cargo 28 being moved from a position level with loading ramp 10b to a position on tilt frame 24 and chassis 18a. FIG. 17C shows cargo 28, transfer bed, and tilt frame 24 on chassis 18a.

In operation, vehicle 18 (FIG. 1), equipped with transferring system 20, may approach the rear of aircraft 10. Loading ramp 10b may be lowered to access cargo 28 in cargo bay 10a (FIG. 2). Vehicle 18 may stop at a distance from loading ramp 10b such that space is allowed for transfer bed 26 to extend between tilt frame 24 and loading ramp 10b.

Cargo 28 may be moved onto transfer bed 26 in a number of manners. In the case where cargo 28 is a vehicle, the vehicle may be driven on to transfer bed 26. In the case where cargo is a container 28a, container 28a may be pushed on imbedded rollers, including transfer bed imbedded rollers 26r, from cargo bay 10a to the upper surface 26n of transfer bed 26. Containers 28a may also be moved using RACI 50 and transfer bed trolley 26b. In FIG. 17A, cargo 28 is shown secured using RACI 50 attached to trolley 26b. Cargo may also be secured using ISO corner fitting twist locks 26t (FIG. 3). Motor 26f may be used to pull cargo 28 through trolley 26b, strap 70, and RACI 50. In FIG. 17A, tilt frame trolley 24a is shown at the distal end of tilt frame 24, while cylinder 30 is extended causing tilt frame 24 to pivot on chassis 18a.

FIG. 17B shows transfer bed 26 and cargo 28 being pulled onto tilt frame 24. As tilt frame motor 24d pulls tilt frame trolley 24a toward the proximate end of tilt frame 24, meshing wheel 32 pivots, in-line and laterally as required by the circumstances, in order to align transfer bed 26 with tilt frame 24. As transfer bed 26 moves toward the proximate end of tilt frame 24, adjustable carriage 34 adjusts and eventually retracts as shown in FIG. 17C.

FIG. 17C shows tilt frame 24 and transfer bed 26 lying horizontally on chassis 18a. Adjustable carriage 34 has collapsed such that rear wheels 34a are raised in order to avoid interference with the movement of vehicle 18. Cylinder 30 has also retracted as tilt frame 24 moved from the pivoted position shown in FIG. 17B to the horizontal position shown in FIG. 17C.

In one preferred embodiment, the invention provides a device for transporting cargo 28 between an aircraft 10 and a land-based vehicle 18 having a vehicle chassis 18a. The invention may include a pivoting tilt frame 24 supported by vehicle chassis 18a and transfer bed 26. Transfer bed 26 is pivotally connected at a first end 26d, to the tilt frame 24 and has a distal end 26u in engaged communication with loading ramp 10b of aircraft 10. This permits cargo 28 from aircraft 10 to be received by the transfer bed 26, and also permits cargo 28 to be transported from transfer bed 26 into the loading compartment of aircraft 10. In the preferred embodiment shown, the transfer bed 26 has an upper surface 26n on which cargo 28 rests, and the upper surface 26n of transfer bed 26 is capable of selective height adjustment relative to the ground 12. Selective height adjustment may be provided by adjustable carriage 34, as described above.

Referring now to FIGS. 18A, 18B, 18C and 18D, another preferred method of practicing the invention is described in sequential views. FIG. 18A shows cargo 28 on the ground 12 to the rear of the transfer system 20 with the RACI 50 attached to the cargo 28. In FIG. 18A, transfer bed 26 is angled as it might in anticipation of receiving cargo 28 located on the ground 12. FIG. 18B shows cargo 28 being moved onto the transfer bed 26. FIG. 18C shows the cargo 28 partially on the transfer bed 26. FIG. 18D shows the cargo 28 on the transfer bed 26.

It should by now be appreciated that various alternative mechanisms and/or modifications to the above-referenced designs may be made while still keeping within the principles of the various inventions described here, examples of which will now be discussed. Durable, flip-away guide rollers (not shown) may be used to facilitate guiding the load onto the cargo bed. Lanyards (small metal cables) may be used on pins to retain the pins. Storage boxes may be added as needed. Because the loading device may be used in exigent circumstances, it may be desirable to configure tilt frame 24 and/or transfer bed 26 so that they may be quickly jettisoned if necessary, such as by employing quick-detach pins and/or quick-disconnect hoses. Chains, such as chain 24e and chain 26h, may be provided with a self-cleaning wiper system (not shown). A perforated deck may be employed to limit weight. Lighting may be incorporated into the bed, using protective pockets for example. One or more sets of controls may be located not just in the vehicle cab but also, for example, just behind the tilt pivot point, on each side of the unit (preferably integrated into the bed and protected).

Referring now to FIGS. 19-24D, an alternative embodiment of the present invention is shown, which provides a different connection between tilt frame 24 and transfer bed 26, enabling enhanced maneuverability between those units. More specifically, the use of spherical bearing 200, which may be used to connect a portion of the tilt frame, such as front beam 233 of the tilt frame deck weldment with spherical bearing base 220 of the transfer bed, provides transfer bed 26 with the ability to rotate about this pivot through 3 degrees of freedom: through a horizontal "X" axis, to allow the transfer bed to swing left to right (a movement enabled by the above-described design); through a vertical "Y" axis to allow the transfer bed to tilt up and down (a movement enabled by the above-described design); and through a perpendicular "Z" axis to allow the transfer bed to roll from side-to-side (a movement not enabled by the above-described design).

Figure 23:
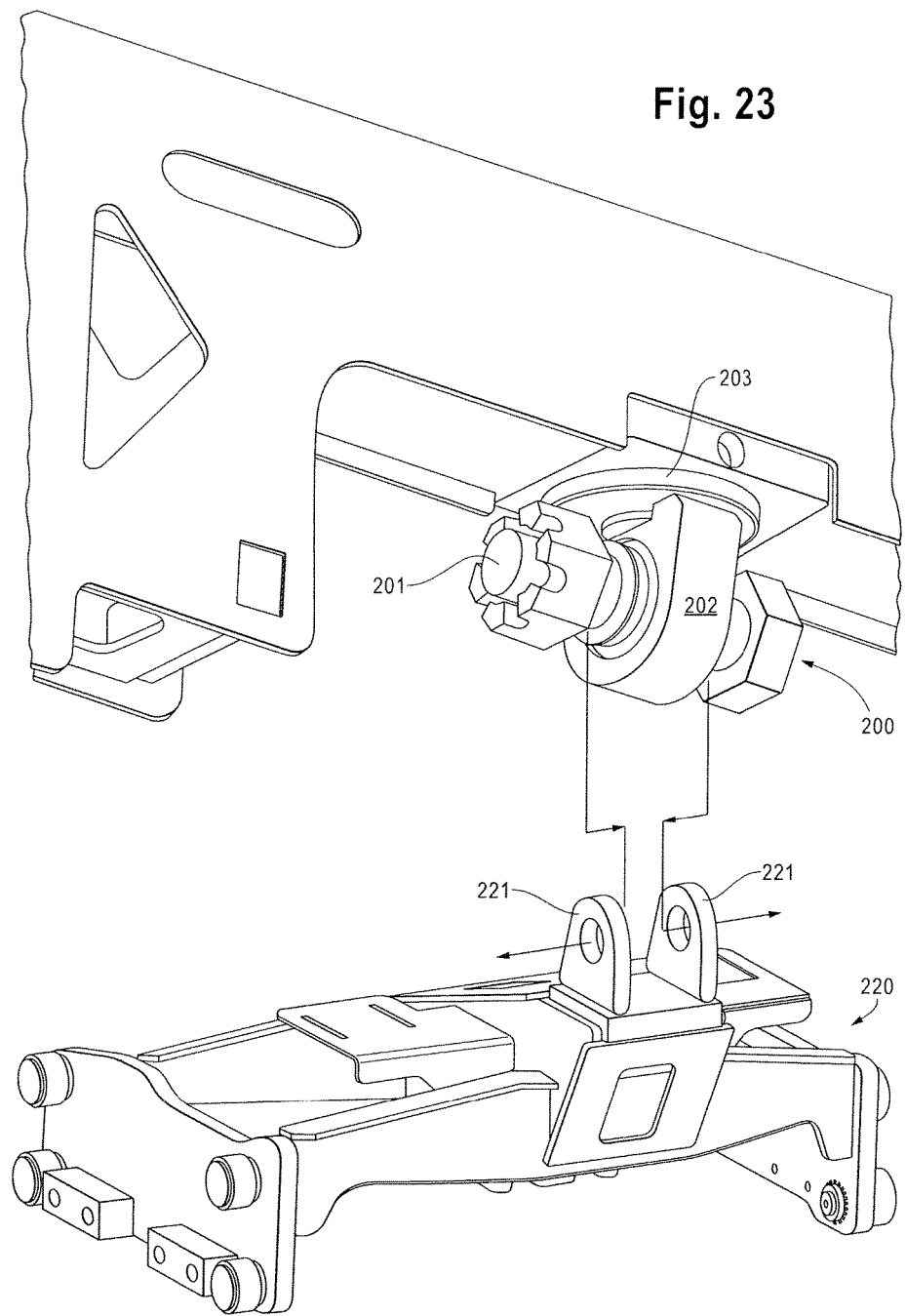
FIG. 23 is an enlarged perspective view of a portion of FIG. 22 showing the components interconnecting the tilt frame and the transfer bed, prior to actual connection, according to the FIG. 19 embodiment.
Figure 24:
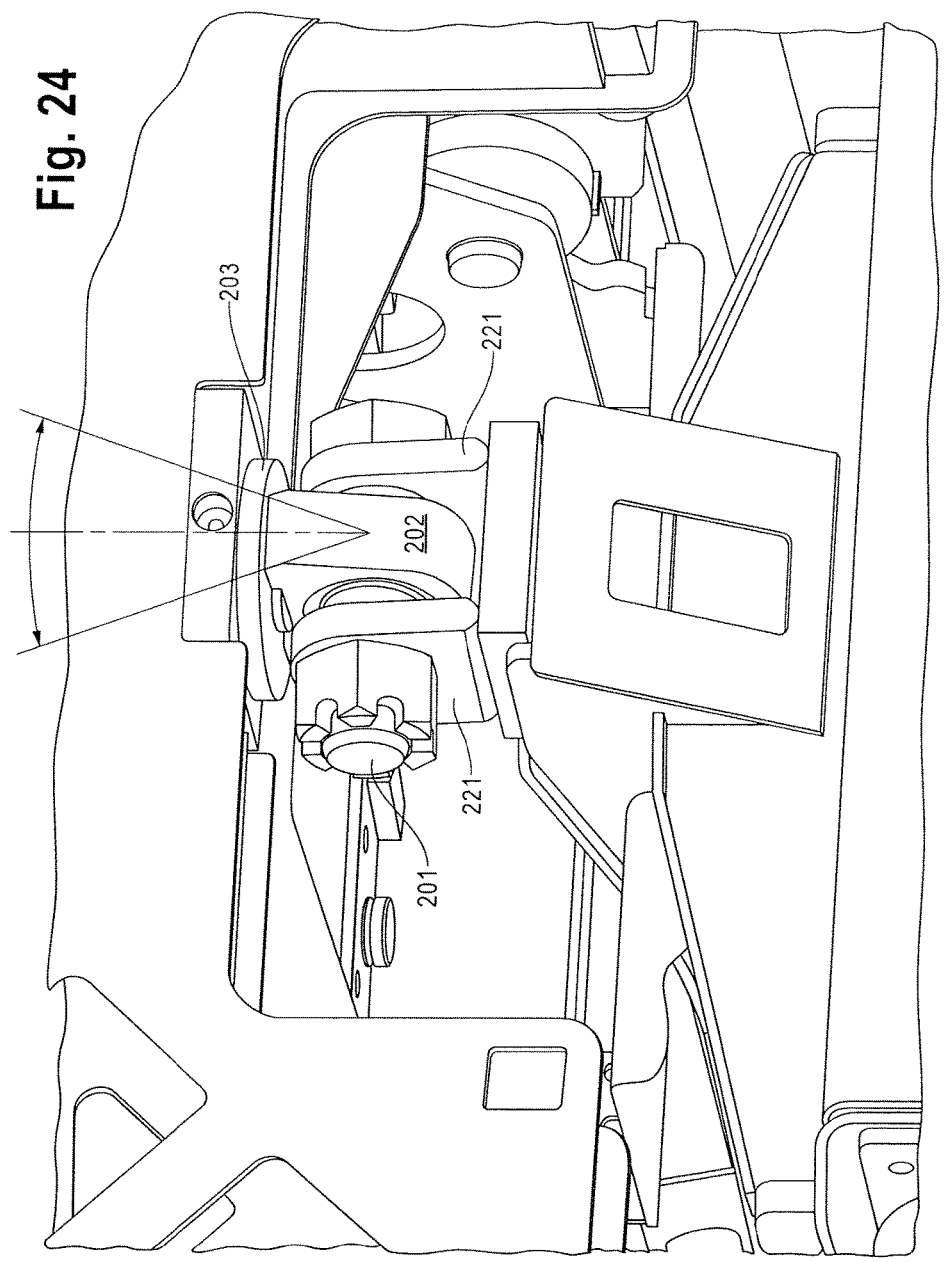
FIG. 24 is an enlarged perspective view, similar to FIG. 23, showing the interconnection between the tilt frame and the transfer bed, according to the FIG. 19 embodiment.
Figure 24A:
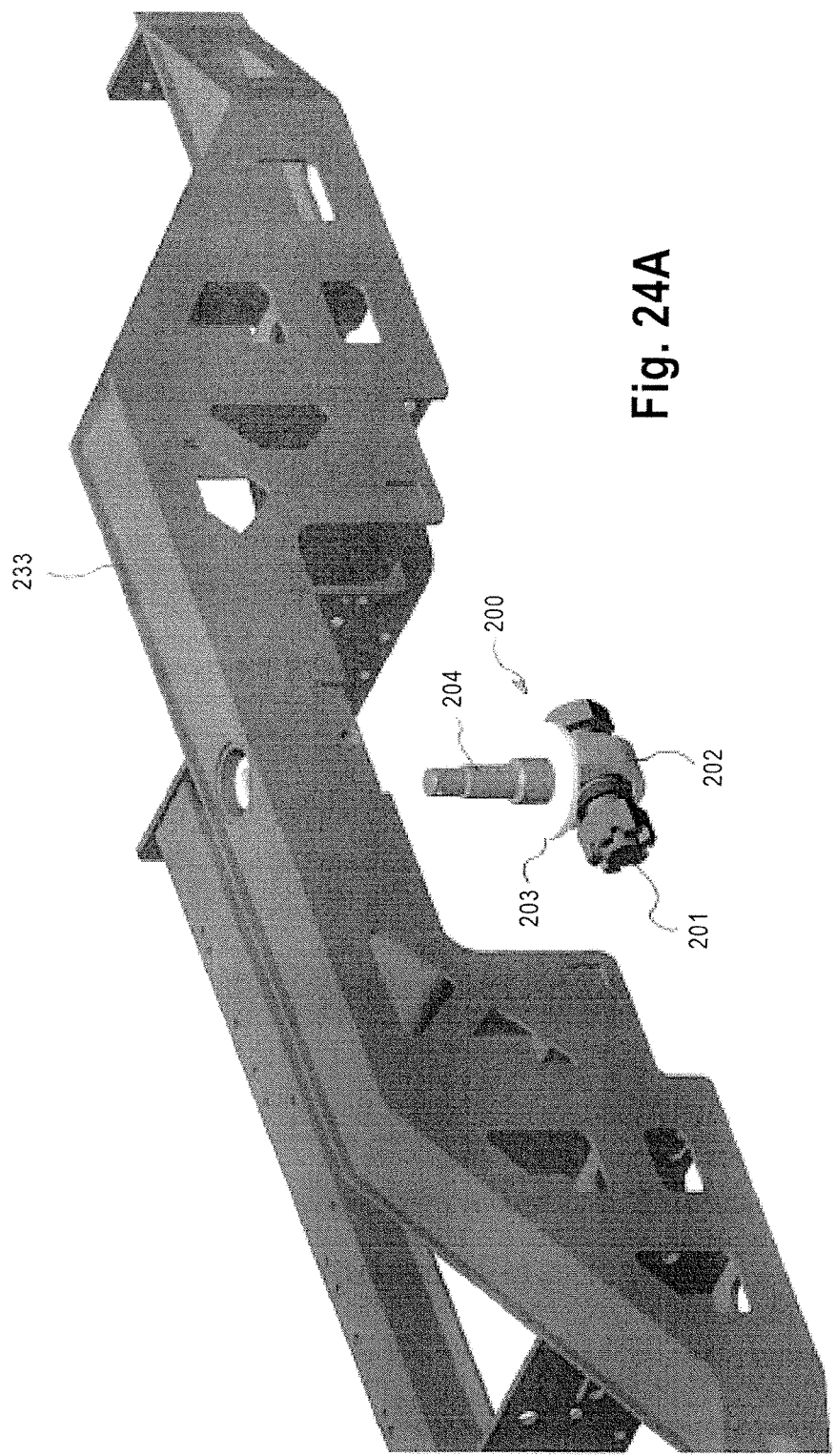
FIGS. 24A-D are partial front perspective views showing the attachment and interaction between one embodiment of the pin (a spherical bearing) joining the tilt frame and transfer bed, enabling the tilt frame and transfer bed to move in the manner shown.
Figure 24B:
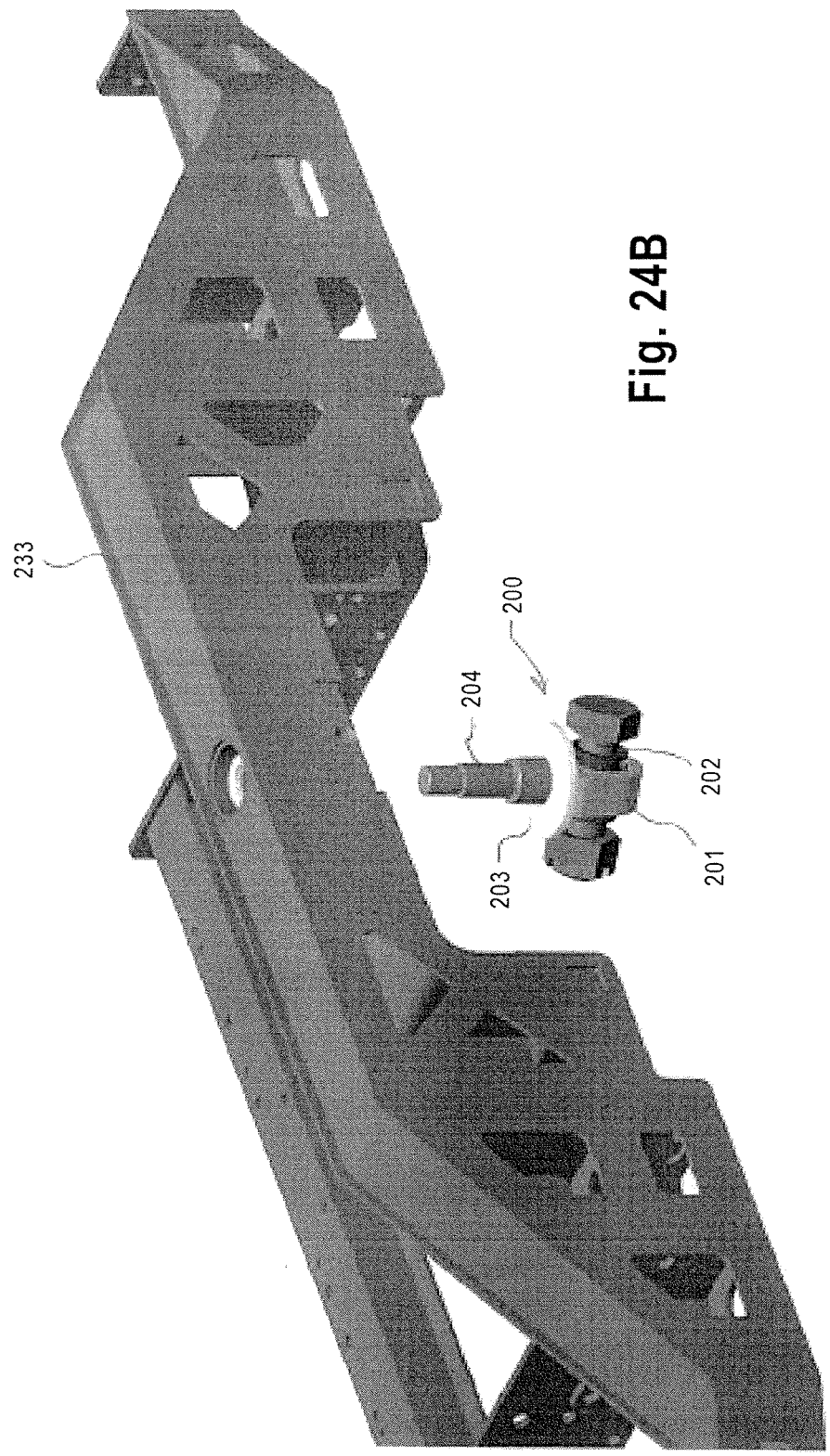
Figure 24C:
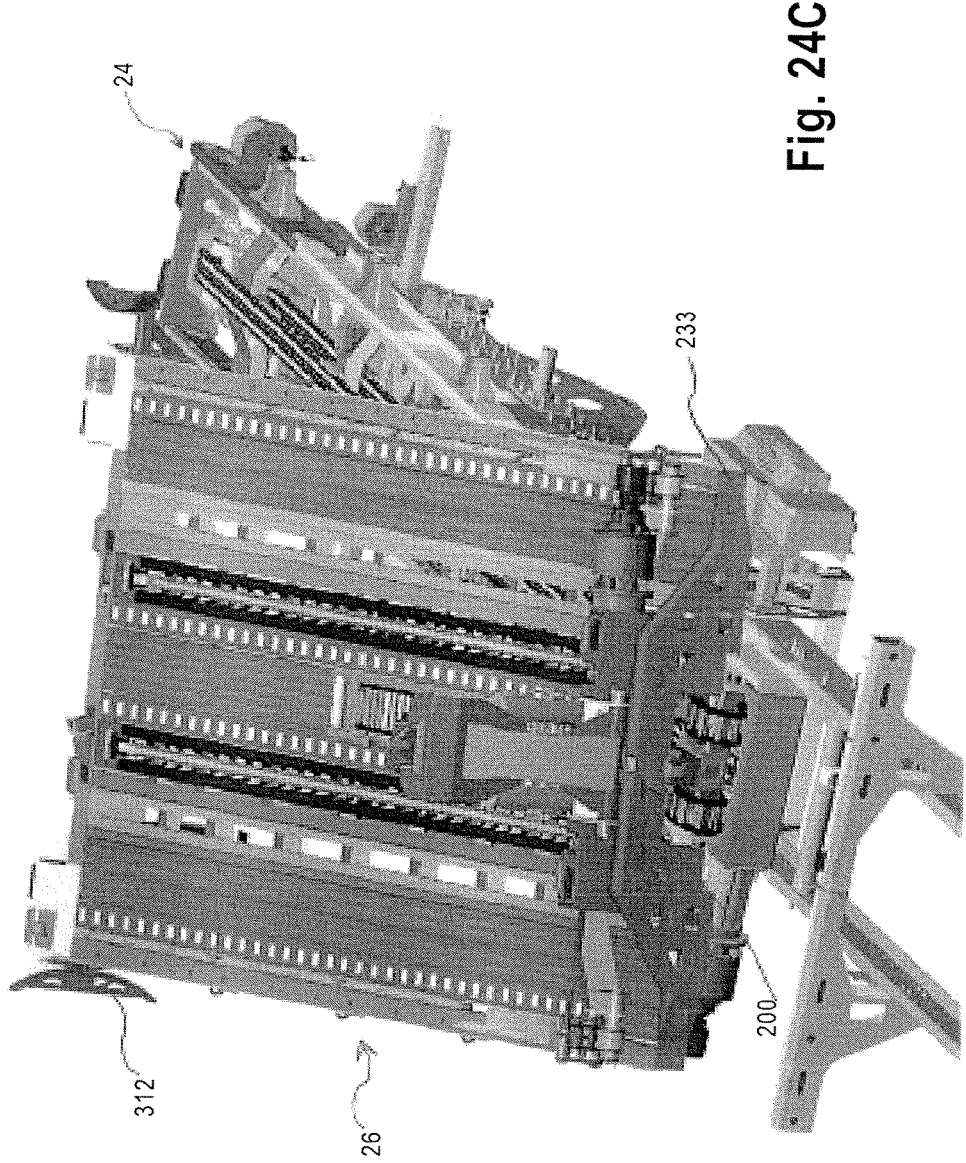
Figure 24D:
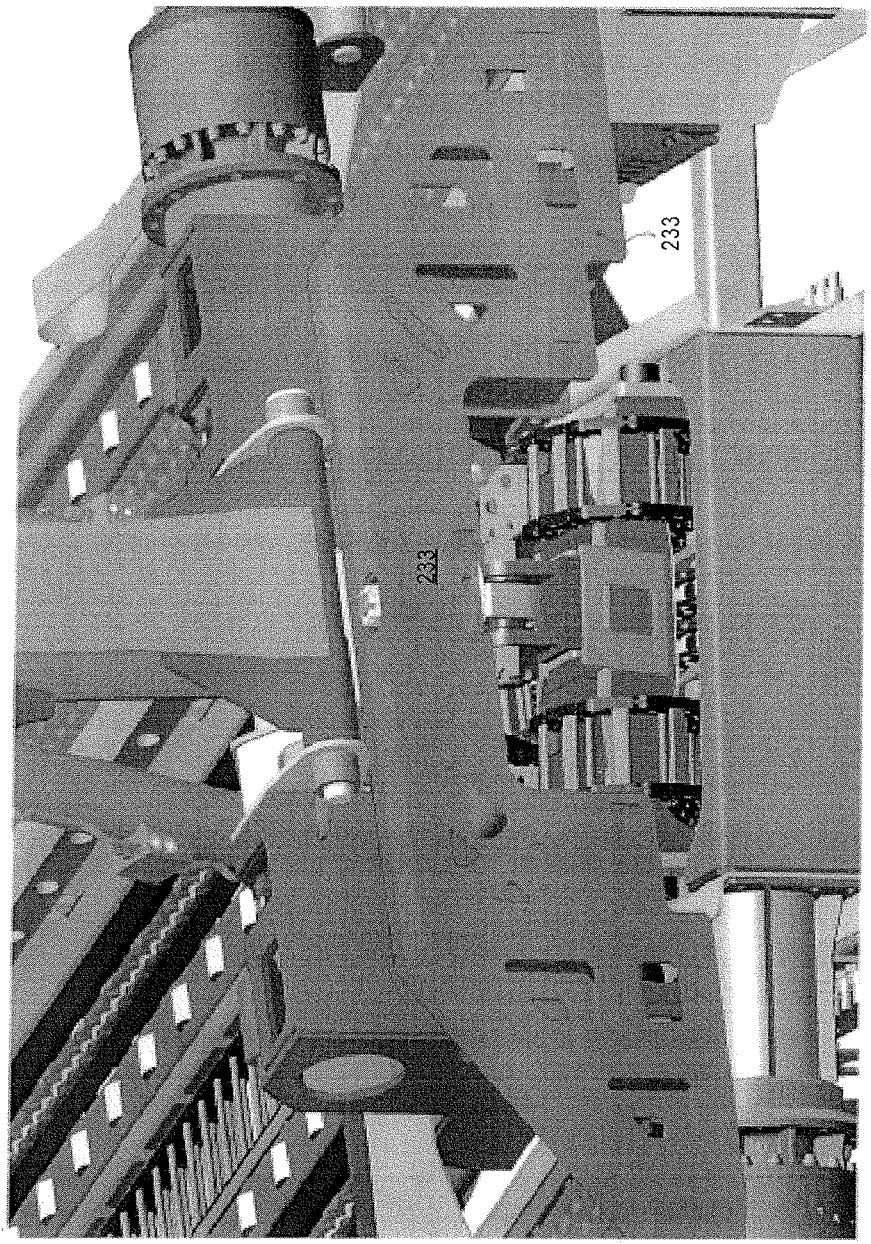
Figure 25:
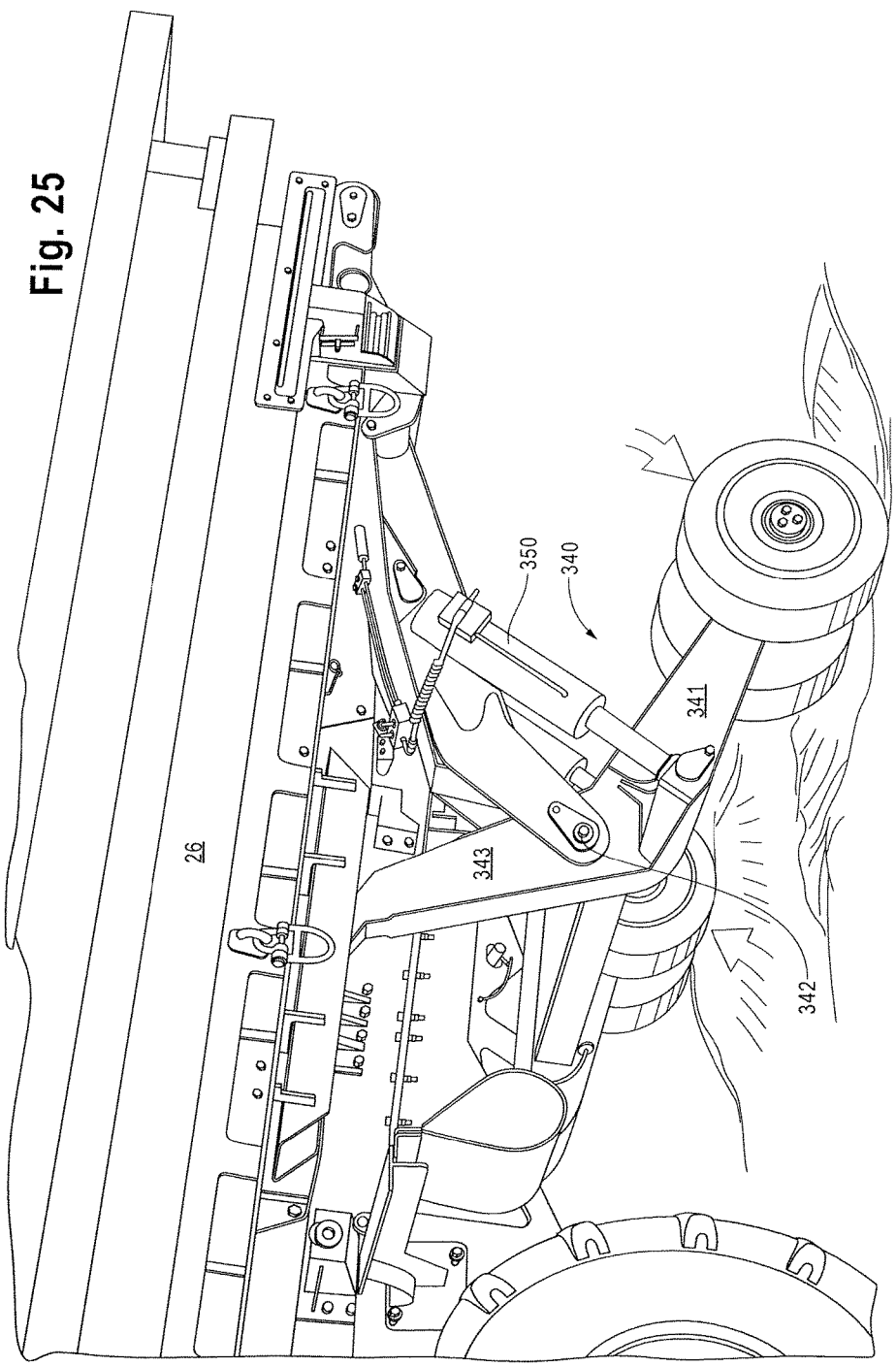
FIG. 25 is an enlarged, side perspective view of a rear portion of the transfer bed, showing one of the independently movable, rear stabilizer legs supporting the transfer bed, according to the FIG. 19 embodiment.

Referring to FIGS. 23-24D, base 220 may be slidably attached to rails 240 on tilt frame 24. Spherical bearing 200 may include vertical pin 204, bearing plate 202, shaft/bolt 201 which passes through a central aperture on plate 202 as well as base ears 221. Bearing 200 may also include circular bearing base 203, about which an end of plate 202 rotates. Plate 202, base 203 and pin 204 may be integrally made, consisting of one component. Front beam 233 of the transfer bed may rotate around vertical pin/shaft 204 while resting on bearing base 203, as indicated in FIGS. 24A-D.

Using spherical bearing 200, and referring now to FIG. 24, this drawing shows how the transfer bed is permitted to roll side-to-side in the "Z" Axis. Referring to FIGS. 24A-D, these drawings show how the transfer bed may be rotated in the vertical "Y" axis.

Figure 26A:
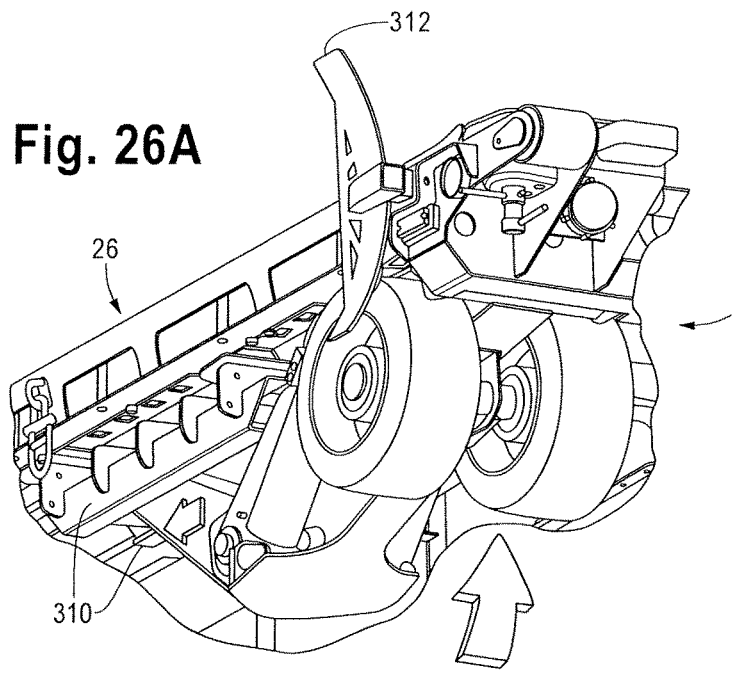
FIGS. 26A-26B are enlarged perspective views of an embodiment of the rear stabilizer leg, in retracted (FIG. 26A) and extended (FIG. 26B) positions.
Figure 26B:
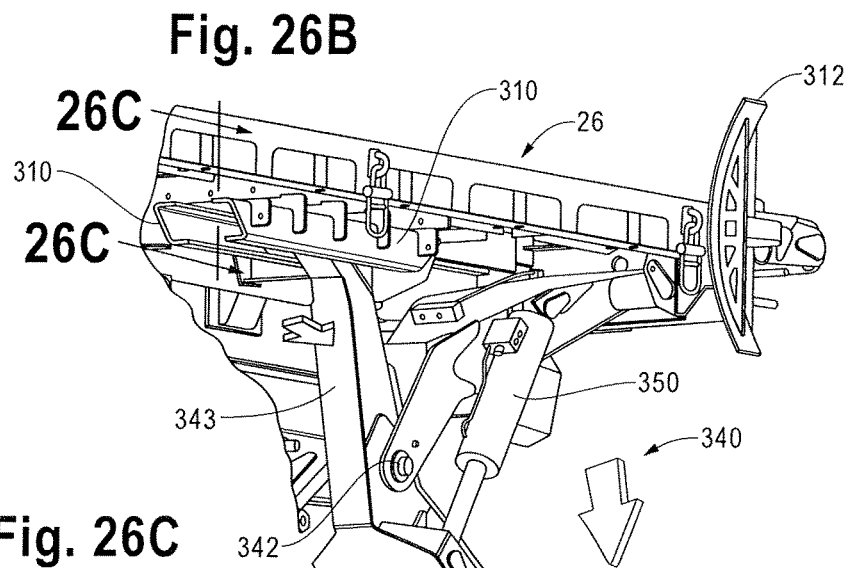
Figure 26C:
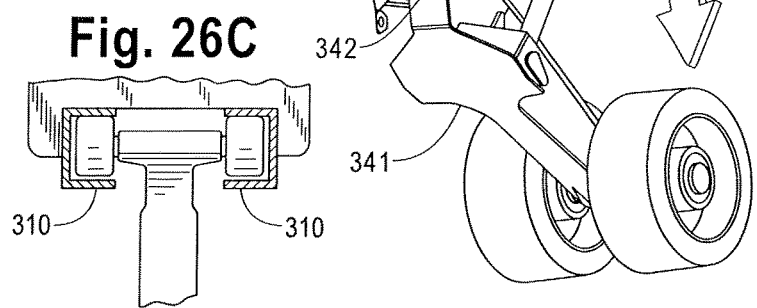
FIG. 26C is a side view along reference line 26C-26C of FIG. 26B.
Figure 27B:
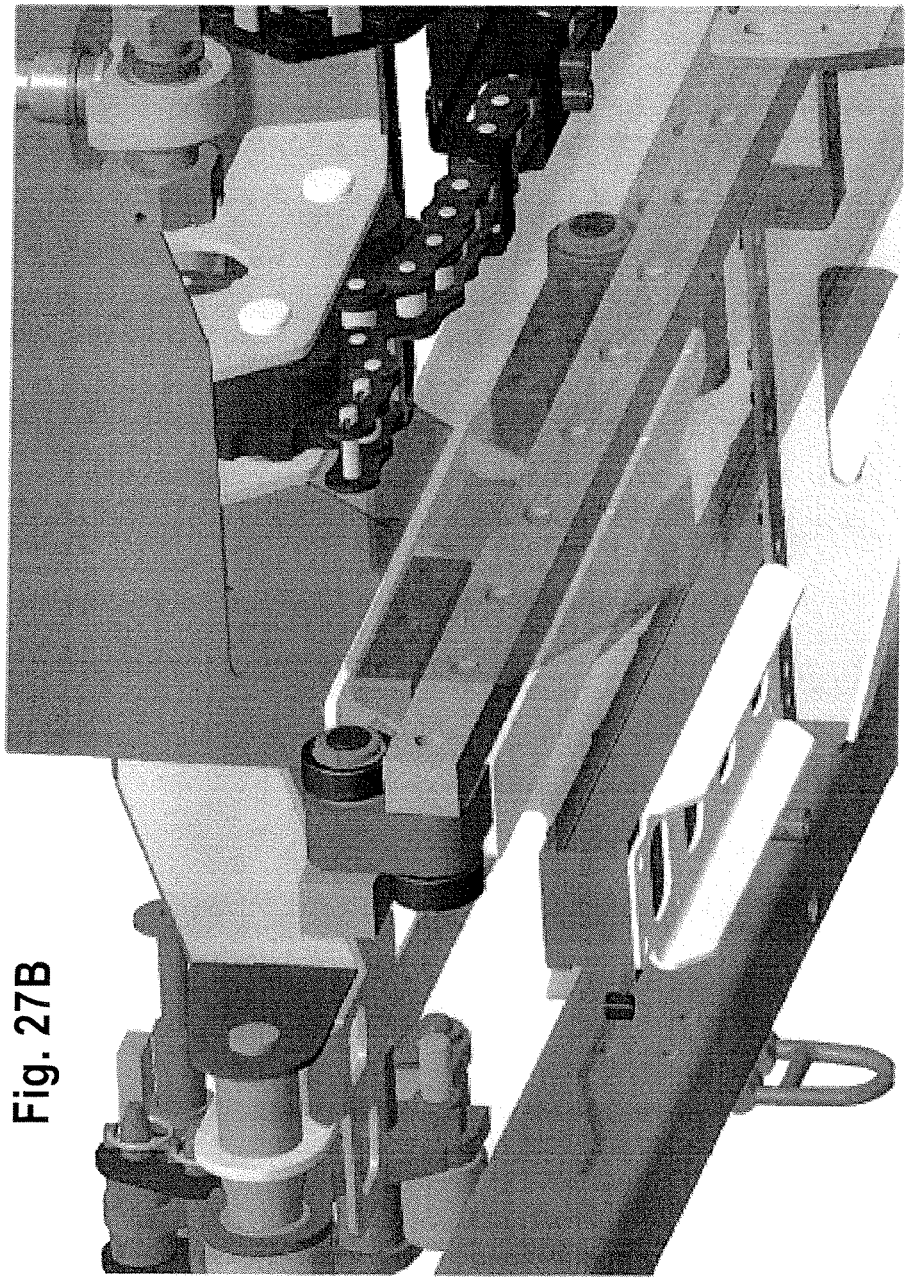
Figure 27E:
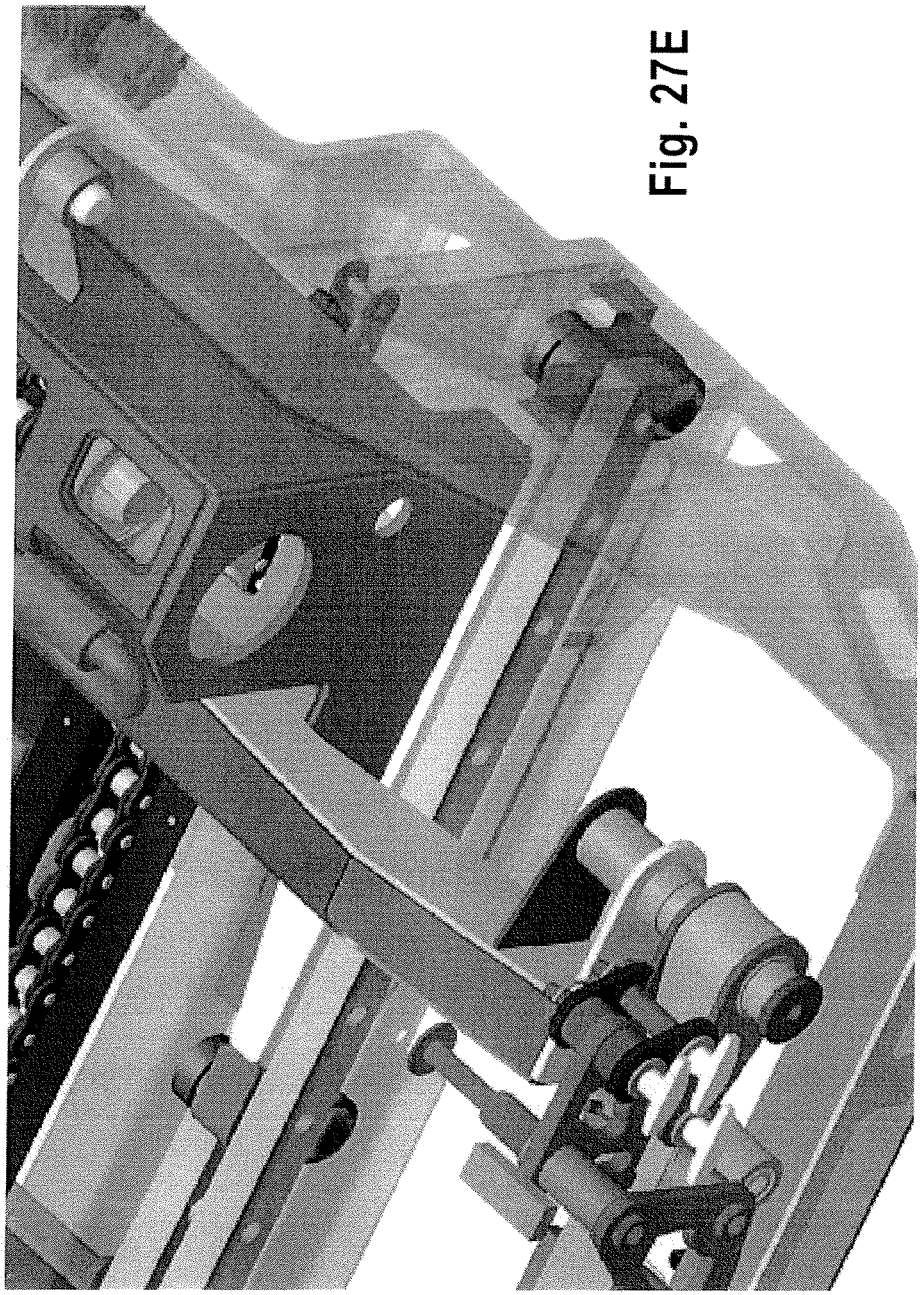
Figure 27F:
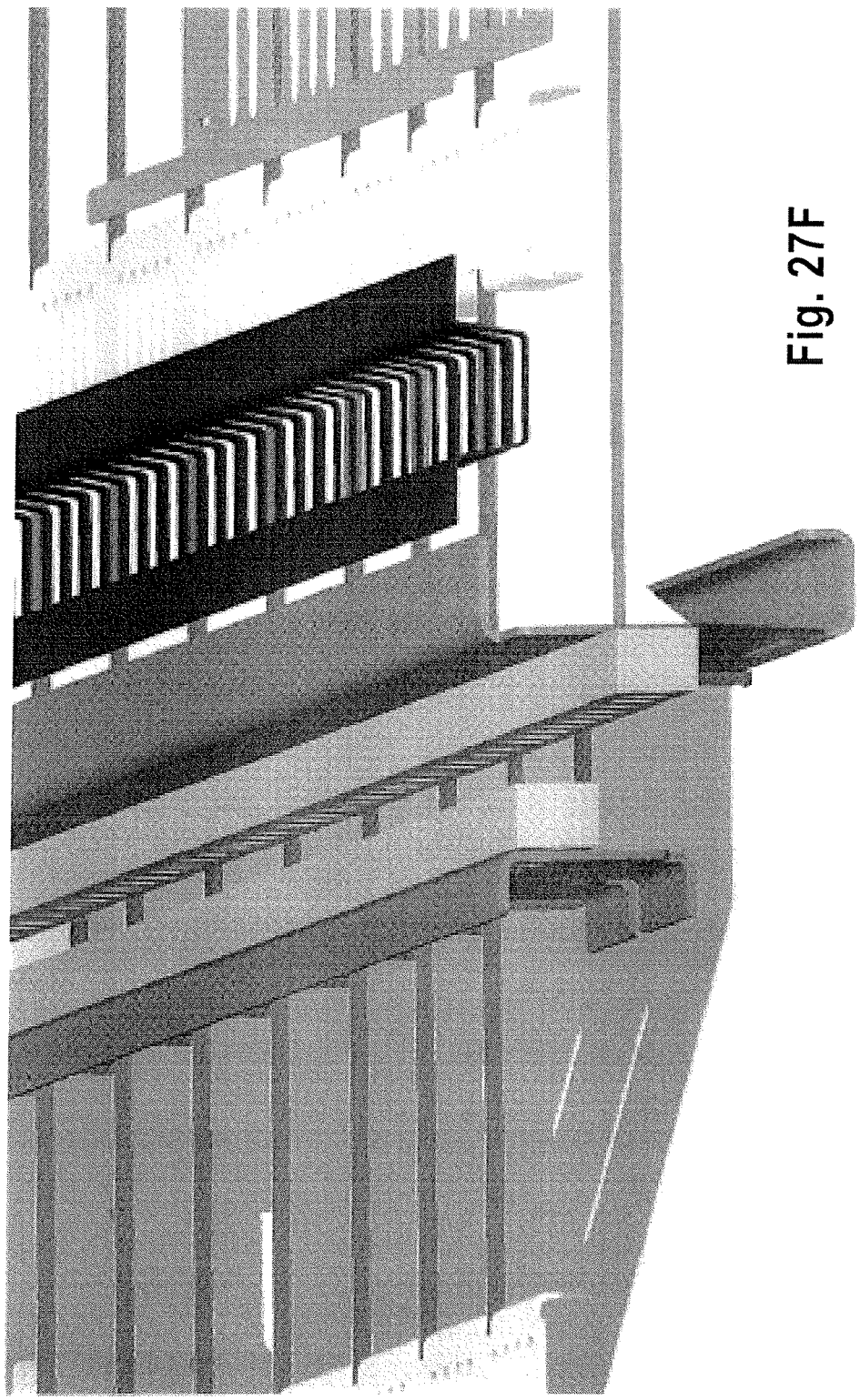
Figure 28:
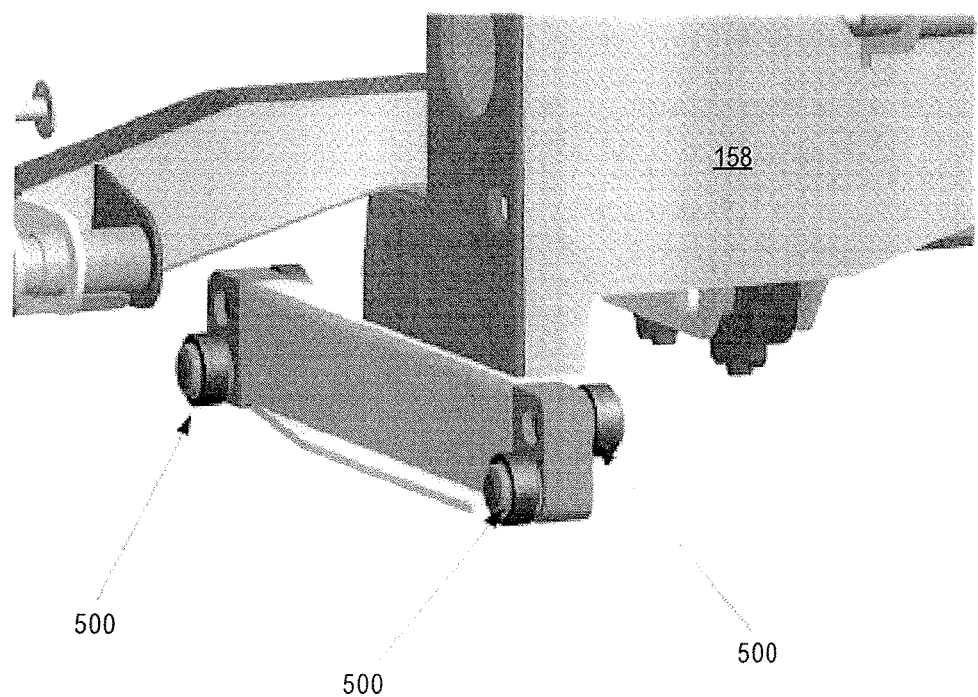
FIG. 28 is a partial, front perspective view of the trolley/adjustable boom roller/travel system configurations.

Referring now to FIGS. 26A-26C, in an alternative embodiment, rear stabilizer legs 340 supporting a rear end of transfer bed 26 may be designed to move from retracted (FIG. 26A) to extended (FIG. 26B) positions independently of each other. Hydraulic cylinder 350 may be used to drive pivoting movement of lower portion 341 of leg 340 about pivot 342 relative to upper leg 343. Upper leg 343 slides front-to-rear in channels 310 as shown in FIG. 26C.

Still referring to FIGS. 26A-C, providing rear stabilizer legs which can be moved independently of each other facilitates the ability of the tiltloader to level the deck of the transfer bed over uneven ground. (The spherical bearing adding the third degree of freedom discussed above also facilitates this ability.)

Figure 20:
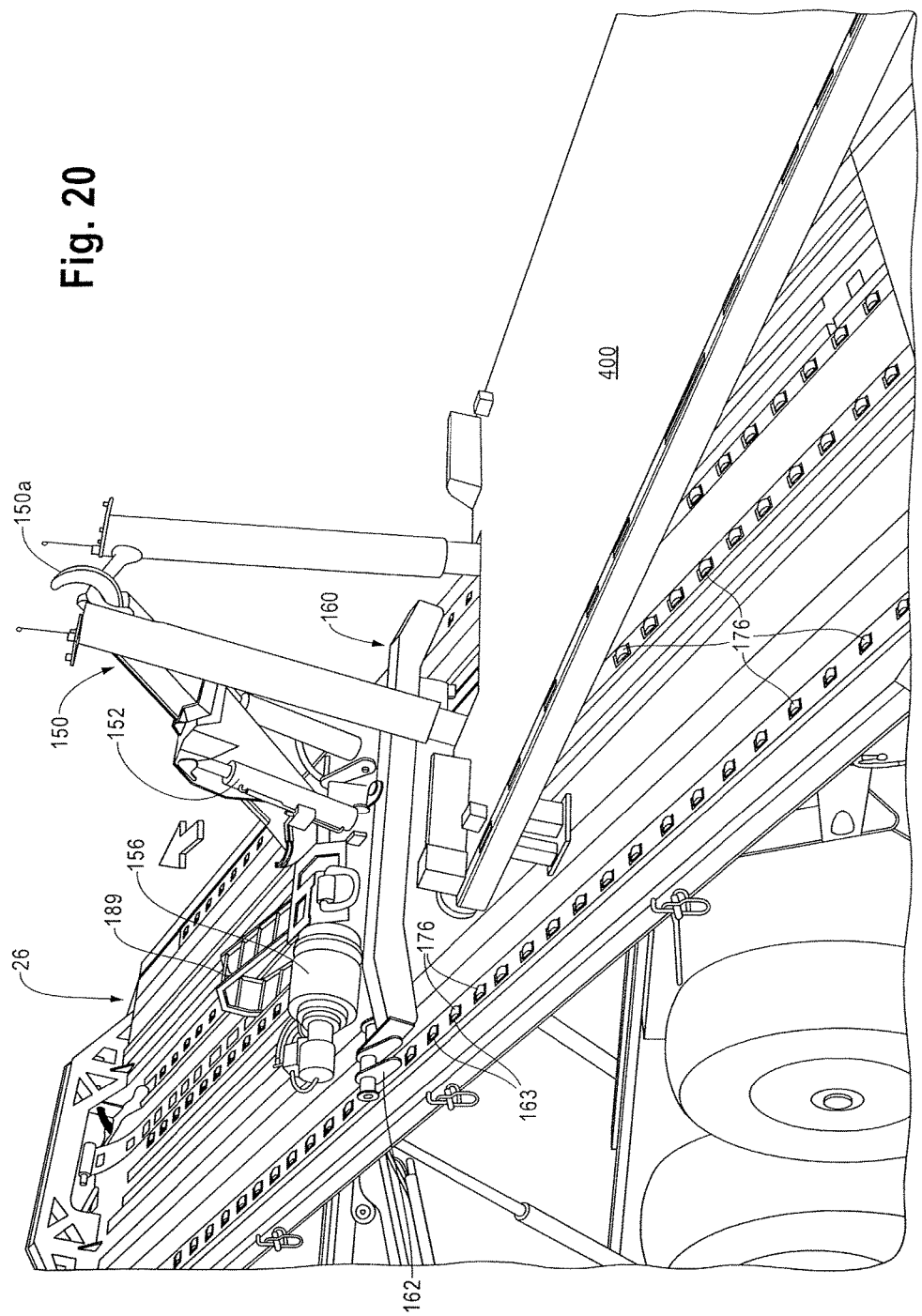
FIG. 20 is a side and rear perspective of the transfer bed advanced to its farthest, front-most position along the tilt frame, according to the embodiment of FIG. 19.
Figure 22:
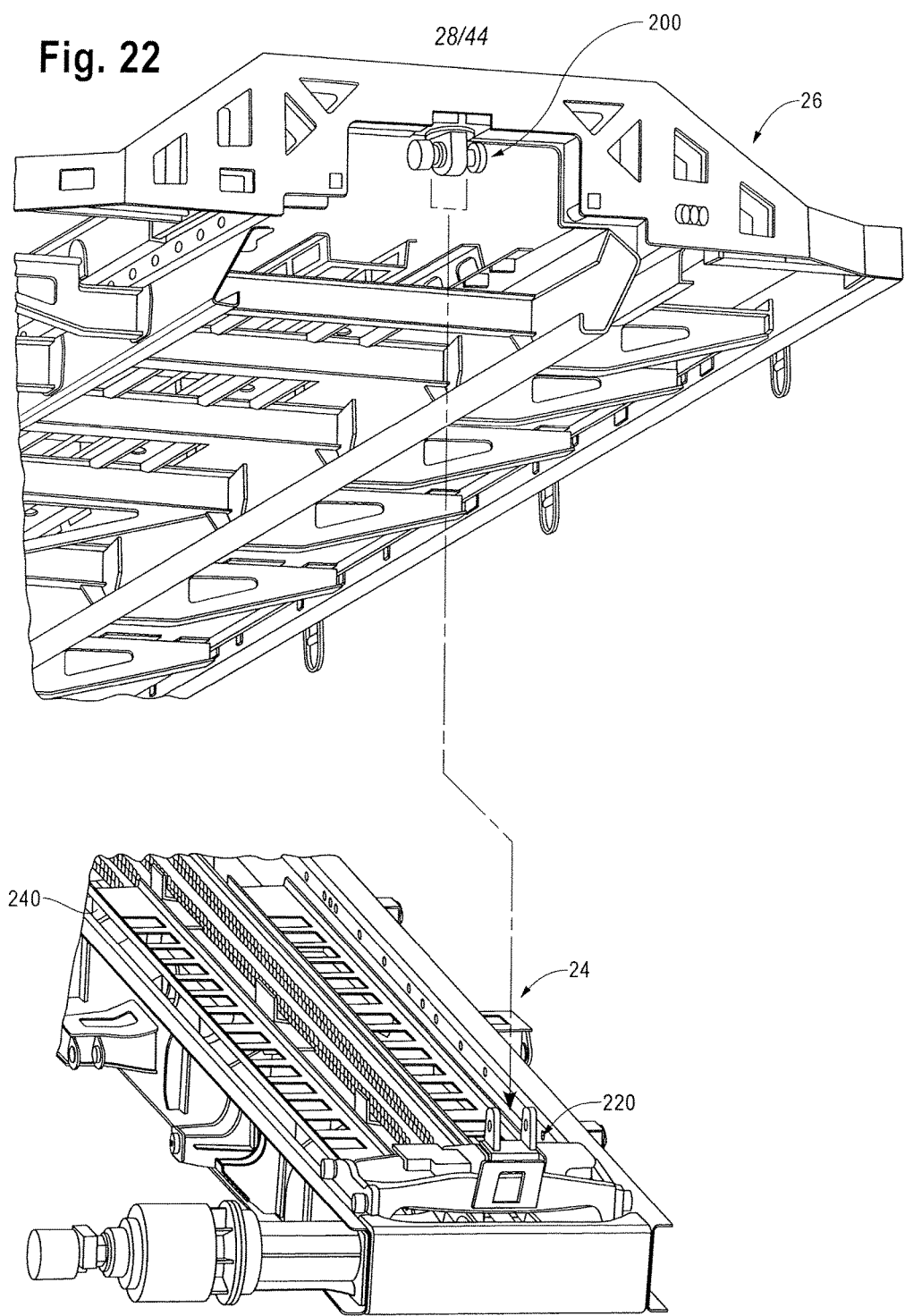
FIG. 22 is a perspective view showing a front and bottom portion of the transfer bed, and its interconnection to the underlying tilt frame, according to the FIG. 19 embodiment.

In another alternative embodiment, an extendable boom may be used in conjunction with transfer bed 26/trolley to allow the tiltloader to load and unload flat rack platforms, such as flat rack 400 (FIG. 20) using hook fork 150. Hook fork assembly 150, including hook fork 150a and hook fork arm 150b, may be pivoted about rod 151 using hydraulic cylinders 152, whose cylinder rods 153 are rigidly attached to fork housing 154. Hydraulic drive motor and gear box assembly 156 may be mounted as shown in FIGS. 20 and 22, and base housing 158 may be rigidly attached to movable carriage 160.

Figure 20A:
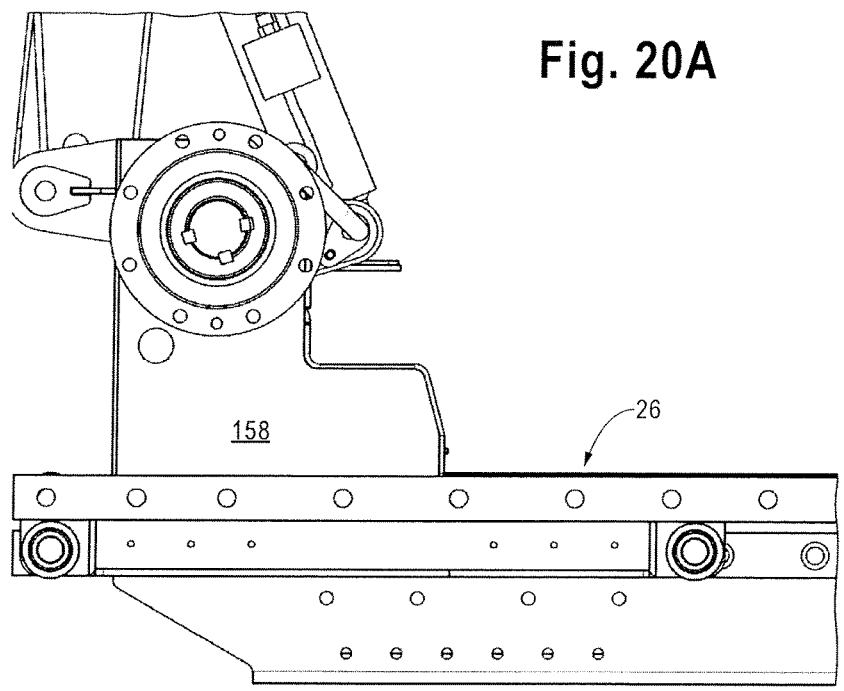
FIG. 20A is a side perspective view.
Figure 20B:
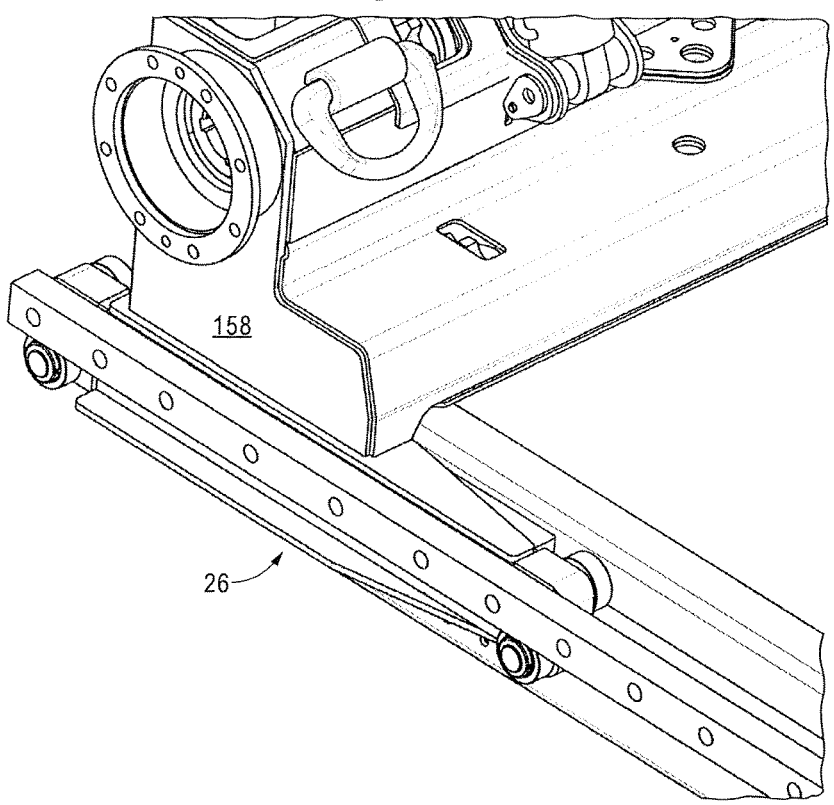
FIG. 20B is a side and rear perspective view, taken along reference line 20A-20A of FIG. 20, at alternating times as the carriage moves up the transfer bed.
Figure 21A:
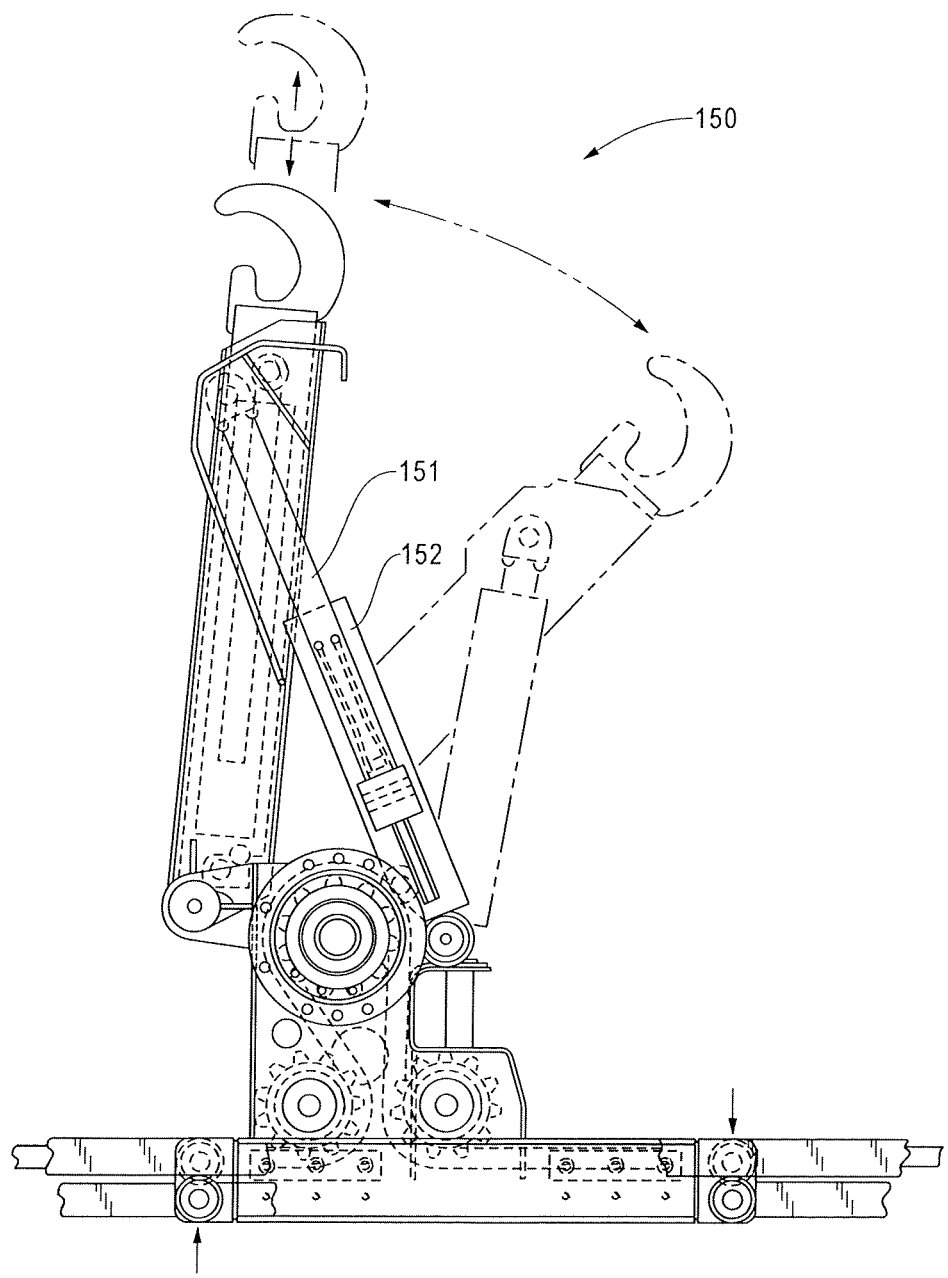
FIG. 21A is a partial side, cross-sectional view of an adjustable boom attached to the trolley which travels front-to-rear on the transfer bed.

Referring to FIG. 21A, a cross-sectional view shows, in one preferred embodiment, crane trolley wheel loading directions when lifting with the hook boom. The arrows represent the moment arms (arrow pushing down on rear, and arrow pushing up on front). If the boom is extended out with load on it, the boom will want to pivot under this loading. Rollers may be entrapped inside the frame, to keep the boom from pivoting and coming out of the frame. As shown in FIGS. 20, 20A and 20B, the adjustable boom may be attached to the trolley which travels front-to-rear on the transfer bed.

Referring to FIGS. 21 and 21B, carriage 160 may include carriage support 160a. Base housing 158 supports and moves carriage support 160A along the upper surface of transfer bed 26. Carriage 160 may be chain-driven and powered by planetary gear box 156 (see FIG. 21B).

Figure 21C:
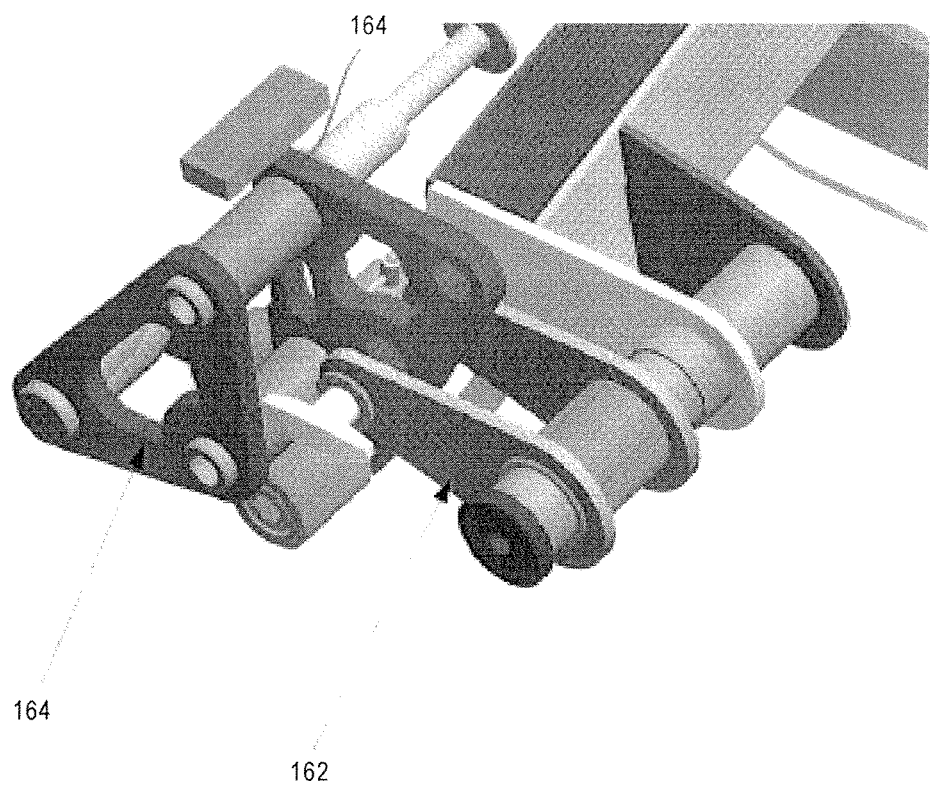
FIGS. 21C-D are partial perspective views showing the Rapid Attach™ brackets.
Figure 21D:
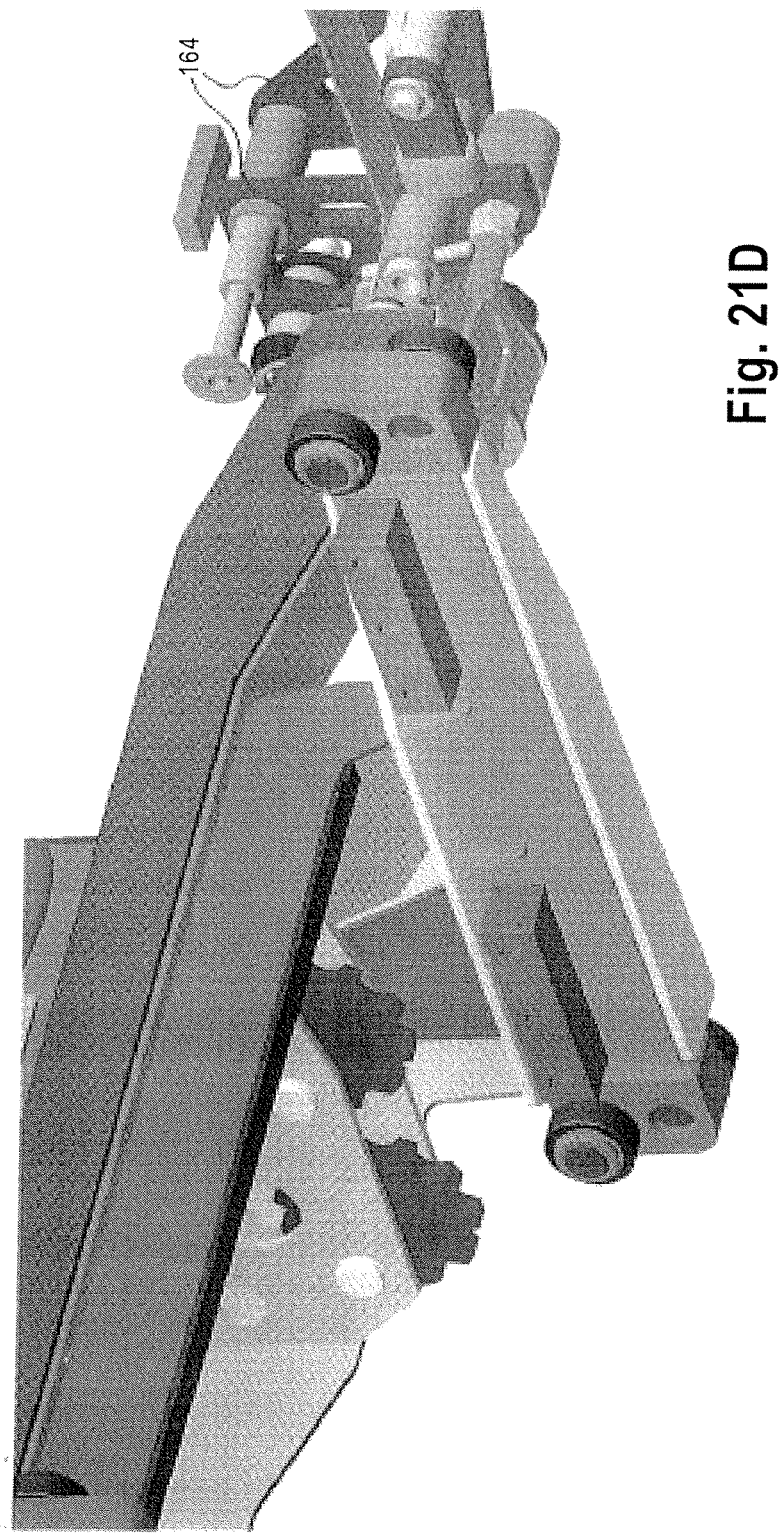

Referring to FIGS. 21 and 21C-D, Rapid Attach™ brackets 164 may have a similar structure and function to brackets 54 of FIG. 6A, and may be attached to pivoting bracket 162 (see also FIG. 20) during container loading and unloading. (Straps may also or alternatively be attached to pivoting bracket 162.)

Figure 29:
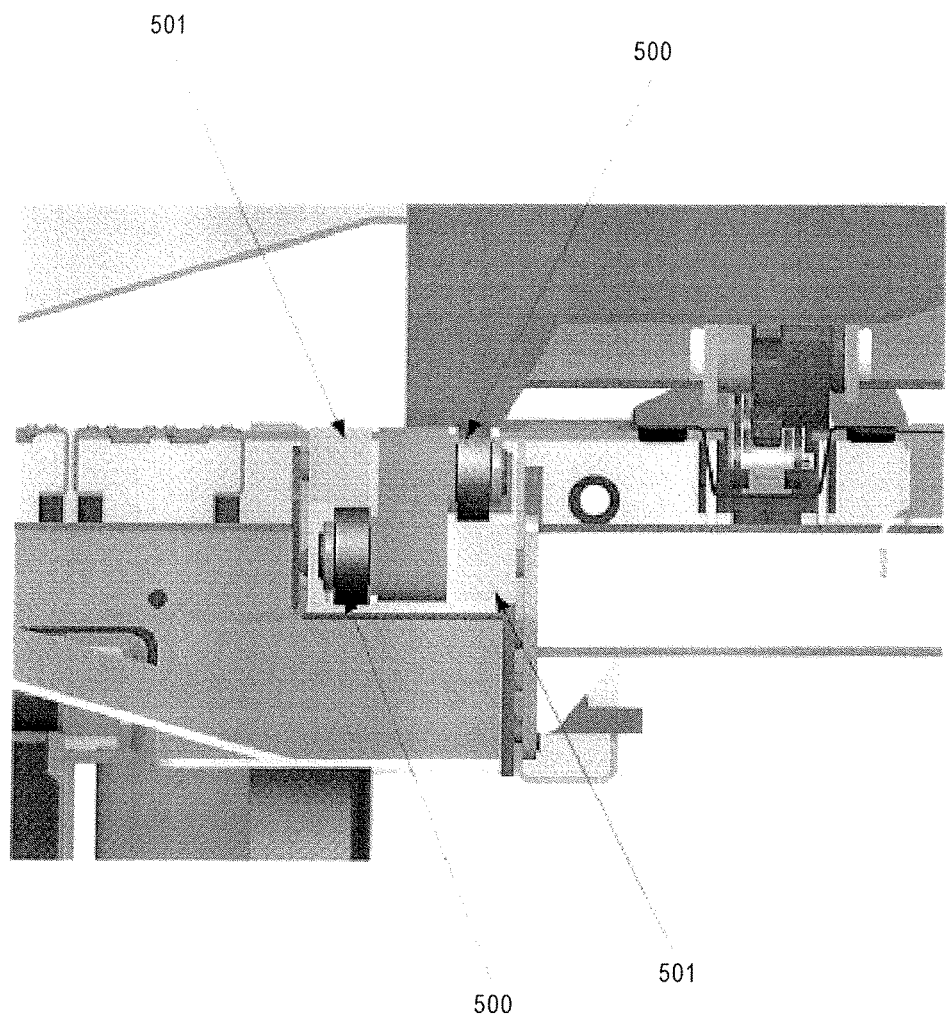
FIG. 29 is a partial, front section view of the trolley/adjustable boom roller/travel system configurations.

Referring to FIGS. 27A-F and FIGS. 28-29, these drawings further demonstrate the functionality of one preferred roller system. In a preferred embodiment, rollers may be employed on the top and bottom of the deck. Thus, in the embodiment shown in these drawings, rollers 500 on the trolley/carriage (one side shown in FIG. 28) are staggered: top on the inside, and bottom on the outside. Referring to FIG. 29, which is a section view from the front of the transfer bed looking to the rear and showing the trolley/carriage roller arrangement, the frame in which the rollers travel has rails 501 (top on the outside, and bottom on the inside) in order to guide and entrap the trolley/carriage both top and bottom as it travels front-to-rear in the transfer bed.

Referring to FIG. 20, track 189 may be employed to house hydraulic hoses and electrical cables, and may travel with the bed. One such track, the PowerTrak, is available from Gleason Reel Corp. of Mayville, Wis. (see http://www.hubbell-gleason.com/engprod/PowerTrak/Catalogs/GTrak/25G.pdf, hereby incorporated by reference herein).

In still another alternative embodiment, a retractable roller system may be provided for transfer bed 26, as shown in FIG. 20, to facilitate the loading and unloading of pallets. When engaged, rollers may extend above the deck of transfer bed 26 so that cargo pallets may be rolled on to the deck. After loading, the rollers may be retracted below the deck, leaving the cargo pallet firmly resting on the deck of the transfer bed. One such roller system, known as the Retract-a-Roll II, is available from Ancra Austalia (see http://www.ancranz.com/products/ancra-retract-a-roll.php, hereby incorporated by reference herein). Thus, referring to FIGS. 20-20E, notches 163 may be provided in the bed, and retractable rollers 176 may protrude through these notches to facilitate roll-loading during pallet transfer, and then retract (FIG. 20D) once the load, such as a pallet or flat rack, rests on the deck. Preferably the rollers are raised with air (when the air is released, the rollers will lower) or, alternatively, the rollers may be raised and lowered through spring-loading or other means.

Referring to FIG. 20F, guide arm 312 may be used to assist in the alignment of containers or flat racks during loading. Guide arm 312 may be positioned either in a stowed position (FIG. 26A), or rotated 90 degrees and extended outward as shown in FIG. 20F.

The above description is not intended to limit the meaning of the words used in the following claims that define the invention. Other systems, methods, features, and advantages of the present invention will be, or will become, apparent to one having ordinary skill in the art upon examination of the foregoing drawings, written description and claims, and persons of ordinary skill in the art will understand that a variety of other designs still falling within the scope of the following claims may be envisioned and used. For example, RACI 50 may be linked together by a brace, bar, rope or any other means, so that the linked pairs may be secured to two corner fittings 28b. It is contemplated that these or other future modifications in structure, function or result will exist that are not substantial changes and that all such insubstantial changes in what is claimed are intended to be covered by the claims.

We claim:

1. A device for moving a tilt frame in relation to a transfer bed capable of adjusting to varying heights, for use in transferring cargo between a vehicle and a loading ramp of varying height, the device comprising:
   a table supported by the tilt frame and mounted on a substantially horizontal axis, the table having a first surface configured to permit coaxial rotation of an opposing second surface located on the transfer bed, and the table capable of rotating about a substantially horizontal axis that is substantially perpendicular to a longitudinal axis of the tilt frame;
   a spherical bearing participating in connecting the tilt frame and the opposing second surface of the transfer bed, the spherical bearing comprising a vertically-extending pin about which the transfer bed pivots, a bearing base, and a bearing plate;
   at least two independently movable rear stabilizer legs supporting a rear end of the transfer bed;
   wherein the transfer bed rotates about the pin and is supported at least in part by the bearing plate and is permitted: (1) to rock side-to-side, about a substantially horizontal axis extending parallel to a longitudinal axis of the transfer bed, relative to the table; (2) to be oriented generally parallel to the ground during inclination of the tilt frame; and (3) to pivot laterally in a side-to-side fashion about a substantially vertical axis passing through the spherical bearing.

2. The device of claim 1, further comprising a trolley movable along the tilt frame, wherein the table is secured to the trolley.

3. The device of claim 2, wherein the trolley is configured to be driven by a chain.

4. The device of claim 1, wherein the transfer bed has first and second ends, and further comprising an adjustable height carriage configured to support the second end of the transfer bed, wherein the transfer bed may be leveled at varying heights by varying at least one of a height of the carriage; and a height of the first end of the transfer bed by moving it along the tilt frame; and wherein the table and the opposing second surface of the transfer bed cooperate to enable the transfer bed to be oriented generally parallel to the ground during inclination of the tilt frame.

5. The device of claim 1, wherein the spherical bearing further comprises opposing base ears, and wherein the base ears, by limiting relative movement of the bearing base and the bearing plate, limit an angle of movement of the spherical bearing.

* * * * *